United States Patent
Su et al.

(10) Patent No.: US 12,393,291 B2
(45) Date of Patent: Aug. 19, 2025

(54) ROLLER MODULE AND INPUT DEVICE WITH SAME

(71) Applicant: Primax Electronics Ltd., Taipei (TW)

(72) Inventors: Chun-Nan Su, Taipei (TW); Chun-Che Wu, Taipei (TW); Chien-Pang Chien, Taipei (TW); Kai-Wen Lee, Taipei (TW); Li-Kuei Cheng, Taipei (TW)

(73) Assignee: Primax Electronics Ltd., Taipei (TW)

( * ) Notice: Subject to any disclaimer, the term of this patent is extended or adjusted under 35 U.S.C. 154(b) by 26 days.

(21) Appl. No.: 18/381,092

(22) Filed: Oct. 17, 2023

(65) Prior Publication Data

US 2025/0077003 A1   Mar. 6, 2025

(30) Foreign Application Priority Data

Sep. 5, 2023 (TW) ................................. 112133586

(51) Int. Cl.
  *G06F 3/0362* (2013.01)
  *G06F 3/0354* (2013.01)
(52) U.S. Cl.
  CPC ........ *G06F 3/0362* (2013.01); *G06F 3/03543* (2013.01)

(58) Field of Classification Search
  CPC .. G06F 3/038; G06F 3/03543; G06F 3/03541; G06F 3/016; G06F 3/0362; G09G 5/34; H01F 7/02; H01F 7/0231; H02K 49/10
  See application file for complete search history.

(56) References Cited

U.S. PATENT DOCUMENTS

2021/0096663 A1*  4/2021  Cheung ................. G06F 3/0362
2024/0036654 A1*  2/2024  Goh ........................ G06F 3/021

\* cited by examiner

*Primary Examiner* — Nitin Patel
*Assistant Examiner* — Amen W Bogale
(74) *Attorney, Agent, or Firm* — KIRTON McCONKIE; Evan R. Witt

(57) ABSTRACT

A roller module includes a scroll wheel, a magnetization member, a swinging element and a pole-reversible magnetic element. The magnetization member is synchronously rotated with the scroll wheel. The swinging element includes a pivotal part, a first magnetic element and a second magnetic element. The first magnetic element and the second magnetic element are movable by using the pivotal part as a rotation center. The pole-reversible magnetic element and the first magnetic element interact with each other. Consequently, the second magnetic element is close to or away from the magnetization member.

25 Claims, 21 Drawing Sheets

ROLLER MODULE AND INPUT DEVICE WITH SAME

FIELD OF THE INVENTION

The present invention relates to a roller module, and more particularly to a roller module that is selectively operable in one of a step scrolling mode and a smooth scrolling mode.

BACKGROUND OF THE INVENTION

Conventionally, a mouse device is equipped with a roller module. In some high-end mouse devices, the roller module can be operated in one of a step scrolling mode and a smooth scrolling mode. However, when the operation mode of the roller module is switched between the step scrolling mode and the smooth scrolling mode, unpleasant noises are easily generated inside the mouse. Due to the unpleasant noises, the user may doubt about the quality and confidence of the product. Furthermore, the existing switching mechanism is usually equipped with a motor to switch the operation mode. However, since the internal space of the mouse device is limited, the layout space of other components within the mouse device will be restricted by the motor.

Therefore, the switching mechanism of the conventional roller module needs to be further improved.

SUMMARY OF THE INVENTION

In order to overcome the drawbacks of the conventional technologies, the present invention provides a roller module. The roller module is applied to an input device. Due to the cooperation of a pole-reversible magnetic element, a swinging element and a magnetization member, the generated sound is attenuated while the operating mode of a scroll wheel of the roller module is switched between a step scrolling mode and a smooth scrolling mode. Moreover, due to the cooperation of the swinging element and a ball bearing, the abrasion is reduced. In addition, the swinging element can be swung more easily, and the use life of the product is extended. The operating mode is switched according to the operations of the pole-reversible magnetic element. When compared with a motor, the installation volume is reduced. In addition, the installation space of other components of the input device is not restricted by the pole-reversible magnetic element.

In accordance with an aspect of the present invention, a roller module is provided. The roller module includes a scroll wheel, a magnetization member magnetization member, a swinging element and a pole-reversible magnetic element. The magnetization member magnetization member is synchronously rotated with the scroll wheel. The swinging element includes a pivotal part, a first magnetic element and a second magnetic element. The first magnetic element and the second magnetic element are movable by using the pivotal part as a rotation center. The pole-reversible magnetic element and the first magnetic element interact with each other. Consequently, the second magnetic element is close to or away from the magnetization member magnetization member.

In an embodiment, the magnetization member magnetization member has a gear structure. The gear structure includes plural tooth tips and plural tooth roots, which are alternately arranged in a radial direction. When the second magnetic element is away from the magnetization member, the scroll wheel is rotated in a smooth scrolling mode. When the second magnetic element is close to the magnetization member, a magnetic attraction force between the second magnetic element and the plural tooth tips of the magnetization member is larger than a magnetic attraction force between the second magnetic element and the plural tooth roots of the magnetization member, so that the scroll wheel is rotated in a step scrolling mode.

In an embodiment, the second magnetic element includes a first magnet, a second magnet and a third magnet. The second magnet is stacked on a top side of the first magnet. The third magnet is stacked on a bottom side of the first magnet. An S-pole terminal and an N-pole terminal of the first magnet are arranged along a horizontal direction. The S-pole terminal of the first magnet is close to a tooth tip of the plural tooth tips of the magnetization member. An S-pole terminal and an N-pole terminal of the second magnet are arranged along a vertical direction. The S-pole terminal of the second magnet faces the first magnet. An S-pole terminal and an N-pole terminal of the third magnet are arranged along the vertical direction. The S-pole terminal of the third magnet faces the first magnet.

In an embodiment, the second magnetic element includes a first magnet, a second magnet and a third magnet. The second magnet is stacked on a top side of the first magnet. The third magnet is stacked on a bottom side of the first magnet. An S-pole terminal and an N-pole terminal of the first magnet are arranged along a horizontal direction. The N-pole terminal of the first magnet is close to a tooth tip of the plural tooth tips of the magnetization member. An S-pole terminal and an N-pole terminal of the second magnet are arranged along a vertical direction. The N-pole terminal of the second magnet faces the first magnet. The S-pole terminal and the N-pole terminal of the third magnet are arranged along the vertical direction. The N-pole terminal of the third magnet faces the first magnet.

In an embodiment, the magnetization member has an external gear structure. The magnetization member has a central channel. The scroll wheel includes a rotation shaft. An end of the rotation shaft is inserted into and fixed in the central channel. Consequently, the magnetization member is permitted to be synchronously rotated with the scroll wheel.

In an embodiment, the magnetization member has an internal gear structure with an outer ring surface, and the scroll wheel has an inner ring surface. The outer ring surface of the magnetization member is fixed on the inner ring surface of the scroll wheel.

In an embodiment, the magnetization member includes plural magnetization sheets, and the plural magnetization sheets are stacked along an axial direction.

In an embodiment, the magnetization member includes plural magnetization blocks and a circular disc. The plural magnetization blocks are formed on the circular disc and distributed radially. The scroll wheel includes a concave structure. The circular disc is disposed within the concave structure.

In an embodiment, the roller module further includes a supporting seat and a ball bearing. The scroll wheel, the magnetization member and the swinging element are supported by the supporting seat. The supporting seat includes a pivotal shaft. The pivotal part of the swinging element is a shaft bushing. The pivotal part of the swinging element is installed on the pivotal shaft of the supporting seat. The ball bearing is arranged between the shaft bushing of the swinging element and the pivotal shaft of the supporting seat. The ball bearing includes an inner ring part and an outer ring part. The inner ring part is contacted with the pivotal shaft of the supporting seat. The outer ring part is contacted with the shaft bushing of the swinging element.

In an embodiment, the roller module further includes a buffering structure. The buffering structure is arranged between the supporting seat and the swinging element.

In an embodiment, a distance between the first magnetic element and the pivotal part is longer than a distance between the second magnetic element and the pivotal part.

In an embodiment, the pole-reversible magnetic element includes a magnetic core and a coil. The coil is wound around the magnetic core. When an electric current flows through the coil, a pole layout of the pole-reversible magnetic element is opposite to a pole layout of the magnetic core.

In an embodiment, the roller module further includes a buffering structure. The buffering structure is arranged between the pole-reversible magnetic element and the first magnetic element.

In accordance with another aspect of the present invention, an input device is provided. The input device includes a casing and a roller module. The casing includes an opening. The roller module includes a scroll wheel, a magnetization member, a swinging element and a pole-reversible magnetic element. The scroll wheel is partially exposed outside through the opening. The magnetization member is synchronously rotated with the scroll wheel. The swinging element includes a pivotal part, a first magnetic element and a second magnetic element. The first magnetic element and the second magnetic element are movable by using the pivotal part as a rotation center. The pole-reversible magnetic element and the first magnetic element interact with each other. Consequently, the second magnetic element is close to or away from the magnetization member.

In an embodiment, the magnetization member has a gear structure. The gear structure includes plural tooth tips and plural tooth roots, which are alternately arranged in a radial direction. When the second magnetic element is away from the magnetization member, the scroll wheel is rotated in a smooth scrolling mode. When the second magnetic element is close to the magnetization member, a magnetic attraction force between the second magnetic element and the plural tooth tips of the magnetization member is larger than a magnetic attraction force between the second magnetic element and the plural tooth roots of the magnetization member, so that the scroll wheel is rotated in a step scrolling mode.

In an embodiment, the second magnetic element includes a first magnet, a second magnet and a third magnet. The second magnet is stacked on a top side of the first magnet. The third magnet is stacked on a bottom side of the first magnet. An S-pole terminal and an N-pole terminal of the first magnet are arranged along a horizontal direction. The S-pole terminal of the first magnet is close to a tooth tip of the plural tooth tips of the magnetization member. An S-pole terminal and an N-pole terminal of the second magnet are arranged along a vertical direction. The S-pole terminal of the second magnet faces the first magnet. An S-pole terminal and an N-pole terminal of the third magnet are arranged along the vertical direction. The S-pole terminal of the third magnet faces the first magnet.

In an embodiment, the second magnetic element includes a first magnet, a second magnet and a third magnet. The second magnet is stacked on a top side of the first magnet. The third magnet is stacked on a bottom side of the first magnet. An S-pole terminal and an N-pole terminal of the first magnet are arranged along a horizontal direction. The N-pole terminal of the first magnet is close to a tooth tip of the plural tooth tips of the magnetization member. An S-pole terminal and an N-pole terminal of the second magnet are arranged along a vertical direction. The N-pole terminal of the second magnet faces the first magnet. The S-pole terminal and the N-pole terminal of the third magnet are arranged along the vertical direction. The N-pole terminal of the third magnet faces the first magnet.

In an embodiment, the magnetization member has an external gear structure. The magnetization member has a central channel. The scroll wheel includes a rotation shaft. An end of the rotation shaft is inserted into and fixed in the central channel. Consequently, the magnetization member is permitted to be synchronously rotated with the scroll wheel.

In an embodiment, the magnetization member has an internal gear structure with an outer ring surface, and the scroll wheel has an inner ring surface. The outer ring surface of the magnetization member is fixed on the inner ring surface of the scroll wheel.

In an embodiment, the magnetization member includes plural magnetization sheets, and the plural magnetization sheets are stacked along an axial direction.

In an embodiment, the magnetization member includes plural magnetization blocks and a circular disc. The plural magnetization blocks are formed on the circular disc and distributed radially. The scroll wheel includes a concave structure. The circular disc is disposed within the concave structure.

In an embodiment, the roller module further includes a supporting seat and a ball bearing. The scroll wheel, the magnetization member and the swinging element are supported by the supporting seat. The supporting seat includes a pivotal shaft. The pivotal part of the swinging element is a shaft bushing. The pivotal part of the swinging element is installed on the pivotal shaft of the supporting seat. The ball bearing is arranged between the shaft bushing of the swinging element and the pivotal shaft of the supporting seat. The ball bearing includes an inner ring part and an outer ring part. The inner ring part is contacted with the pivotal shaft of the supporting seat. The outer ring part is contacted with the shaft bushing of the swinging element.

In an embodiment, a distance between the first magnetic element and the pivotal part is longer than a distance between the second magnetic element and the pivotal part.

In an embodiment, the pole-reversible magnetic element includes a magnetic core and a coil. The coil is wound around the magnetic core. When an electric current flows through the coil, a pole layout of the pole-reversible magnetic element is opposite to a pole layout of the magnetic core.

In an embodiment, the input device is a mouse device, a keyboard, a drawing tablet, a game controller, a video editor or a live broadcast controller.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. In the following embodiments and drawings, the elements irrelevant to the concepts of the present invention are omitted and not shown.

The present invention provides a roller module and an input device with the roller module. The roller module can be selectively operated in one of a step scrolling mode and a smooth scrolling mode. The structure of the roller module is specially designed. Consequently, during the process of switching the operation mode of the roller module, the possibility of generating unpleasant noises will be reduced, and the user's confidence in the product will be increased. In addition, the switching smoothness is enhanced, the wear problem is reduced, and the power-saving efficacy is enhanced.

The roller module of the present invention can be applied to a variety of input devices. An example of the input device includes but is not limited to a mouse device, a keyboard, a drawing tablet, a game controller, a video editor or a live broadcast controller. The roller module is installed on the input device to generate a scrolling command, a zoom-in command, a zoom-out command, a menu selecting command or any other appropriate command. The input device comprises a casing. A scroll wheel of the roller module is partially exposed outside the casing to be operated by the user. In addition, the input device is equipped with a power supply unit for providing an electric current to the roller module.

A roller module according to a first embodiment of the present invention and an input device with the roller module will be illustrated with reference to FIGS. 1 to 7 and FIGS. 9 to 10.

Figure 1:
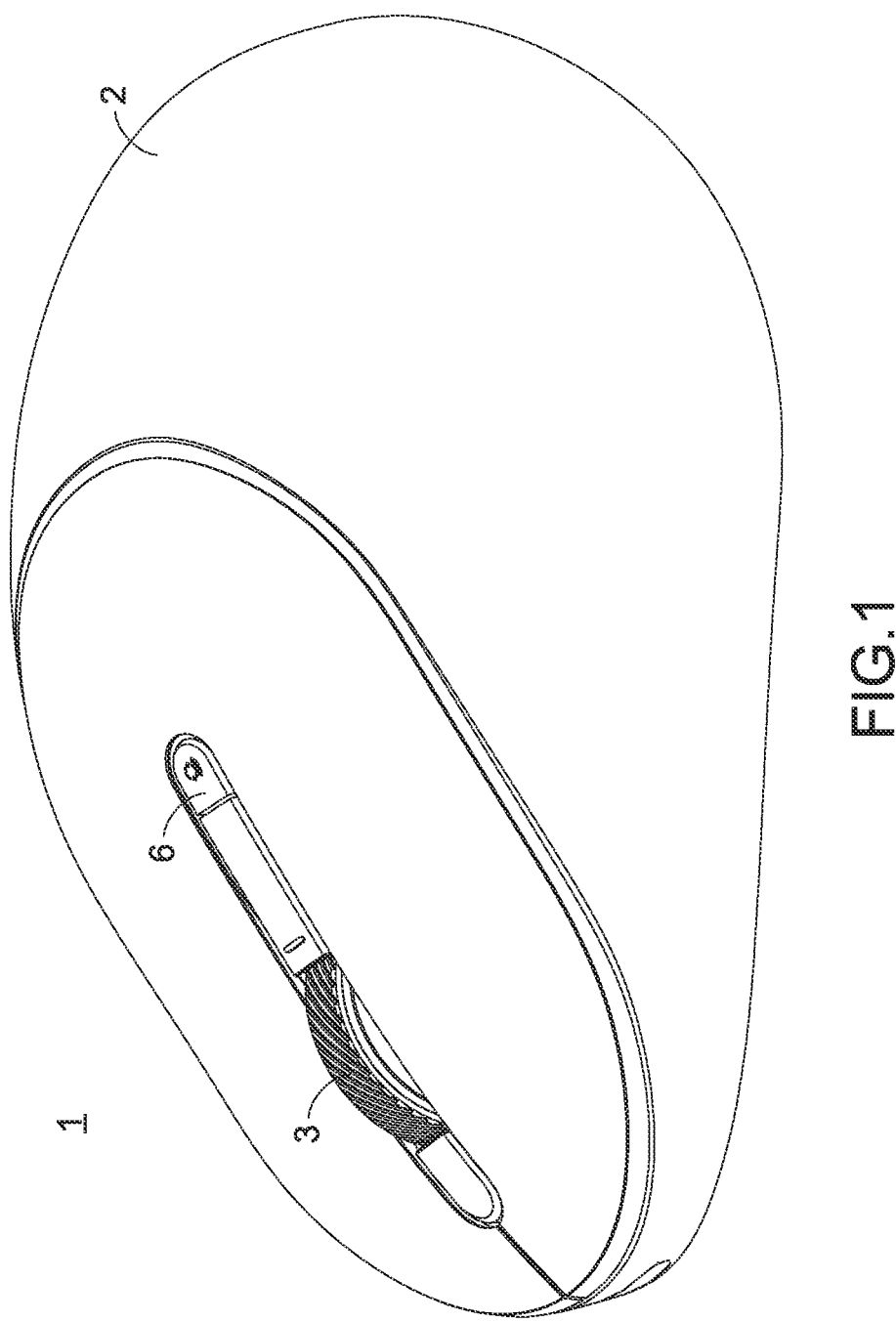
FIG. 1 is a schematic perspective view illustrating an input device according to a first embodiment of the present invention.
Figure 2:
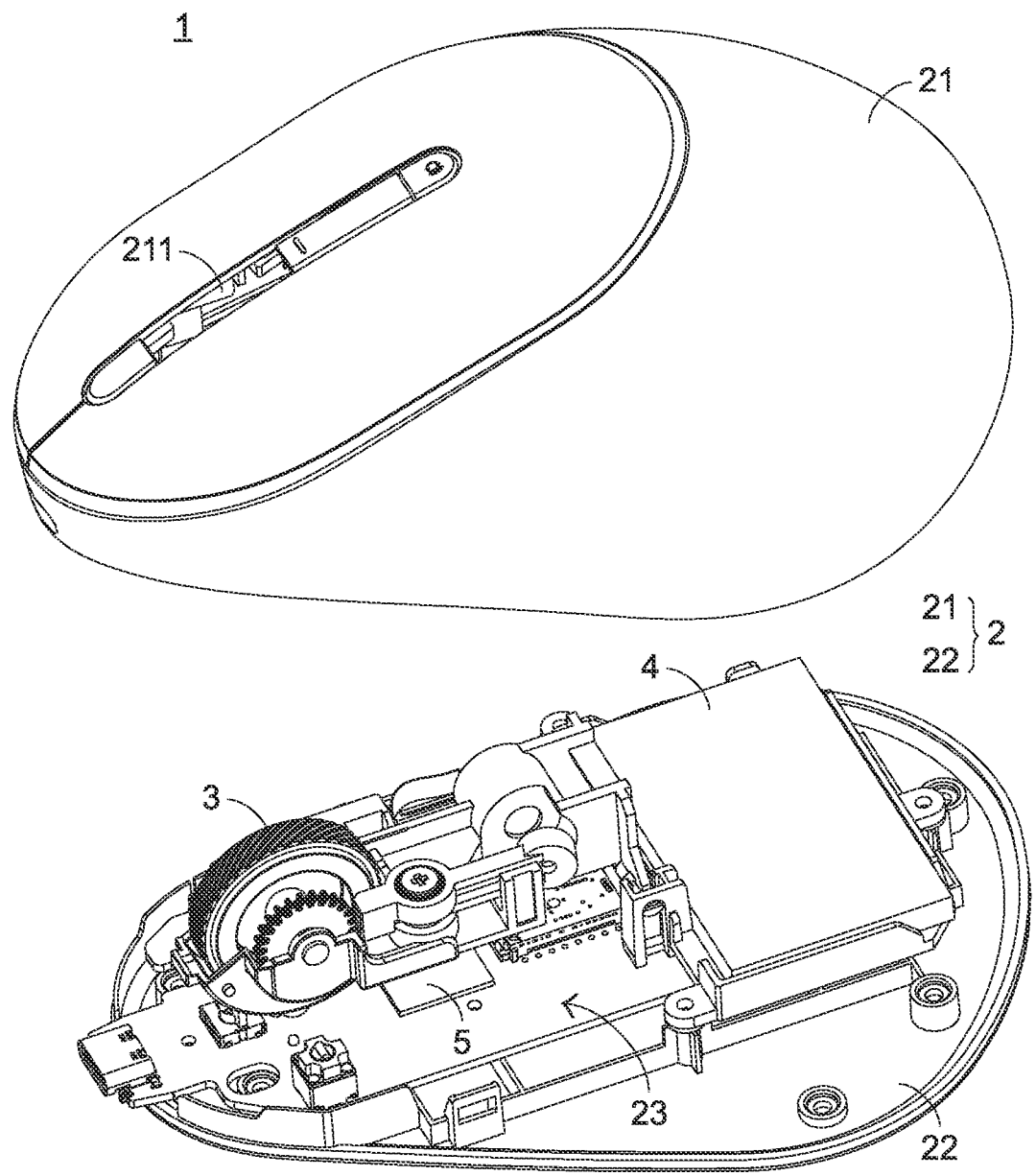
FIG. 2 is a schematic exploded view illustrating the input device shown in FIG. 1.
Figure 3:
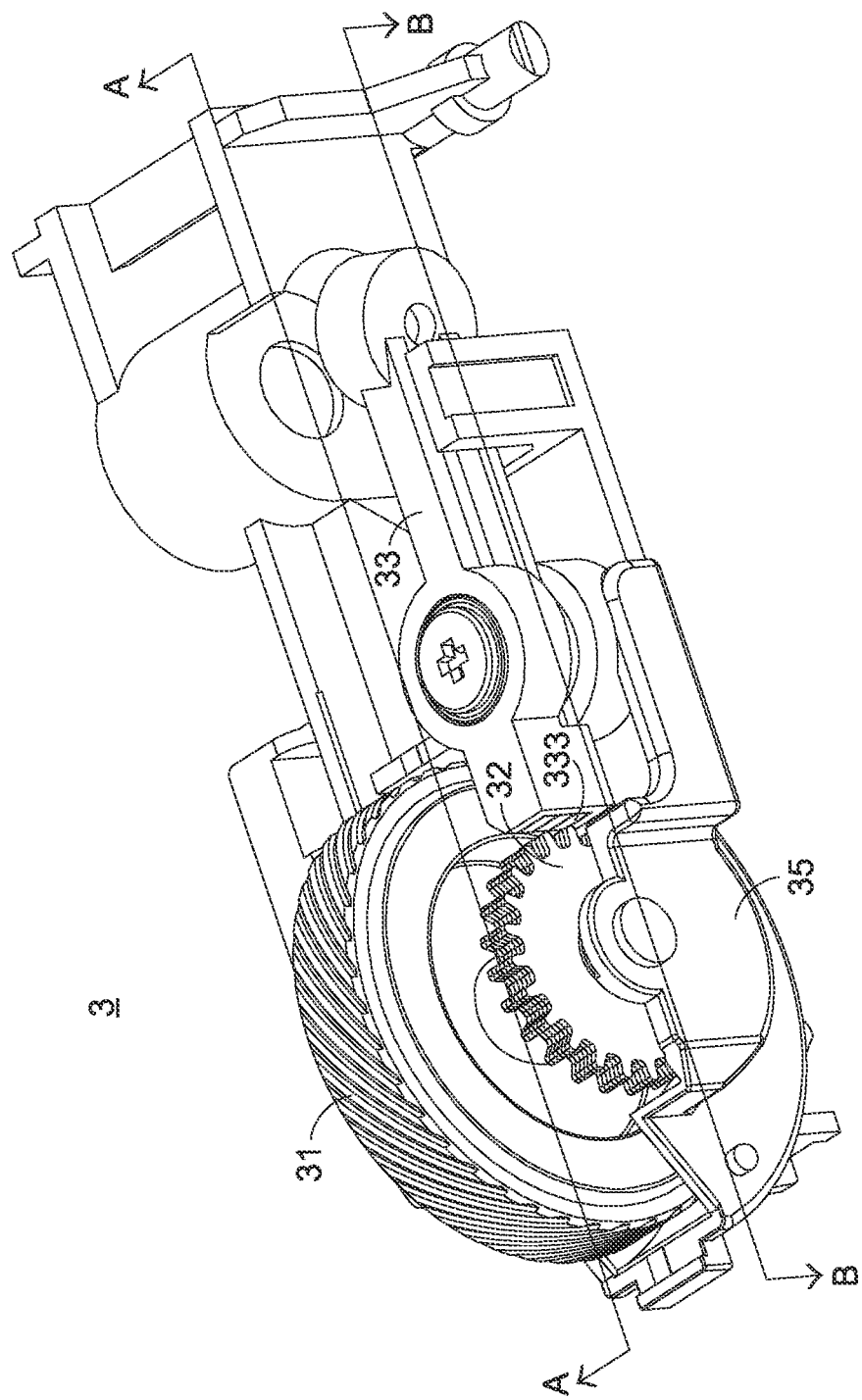
FIG. 3 is a schematic perspective view illustrating the roller module of the input device in a step scrolling mode.
Figure 4:
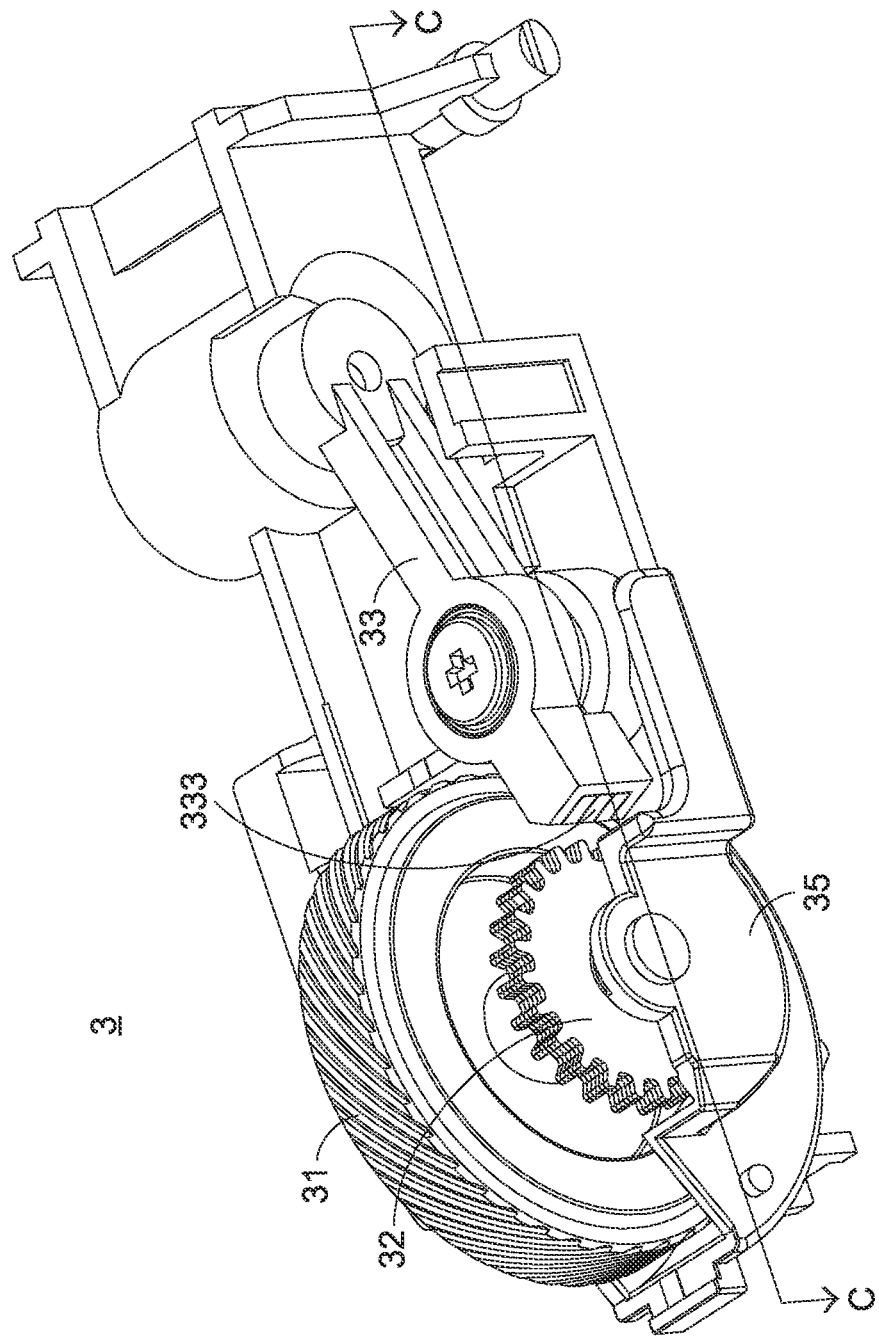
FIG. 4 is a schematic perspective view illustrating the roller module of the input device in a smooth scrolling mode.
Figure 5:
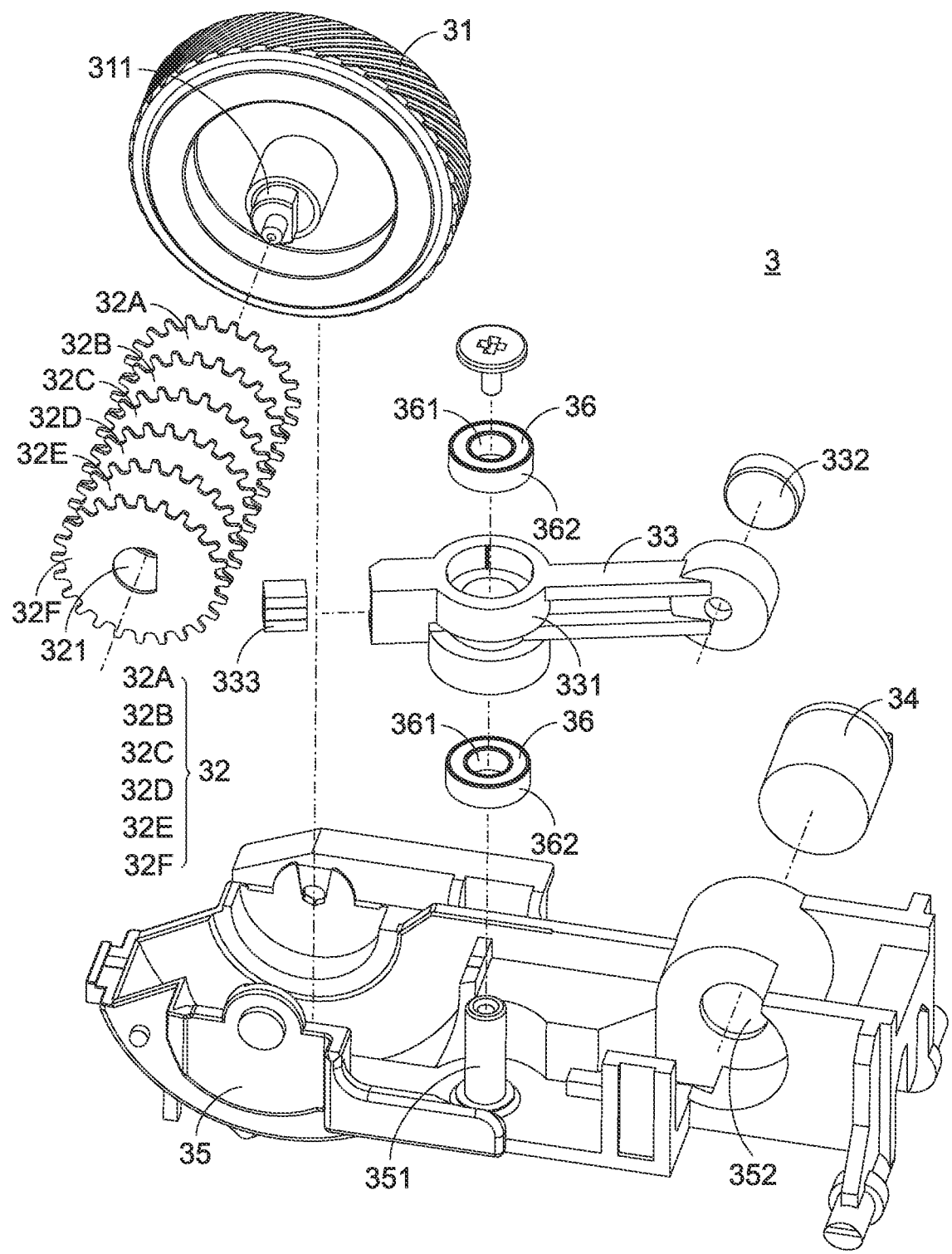
FIG. 5 is a schematic exploded view illustrating the roller module shown in FIG. 3.
Figure 6:
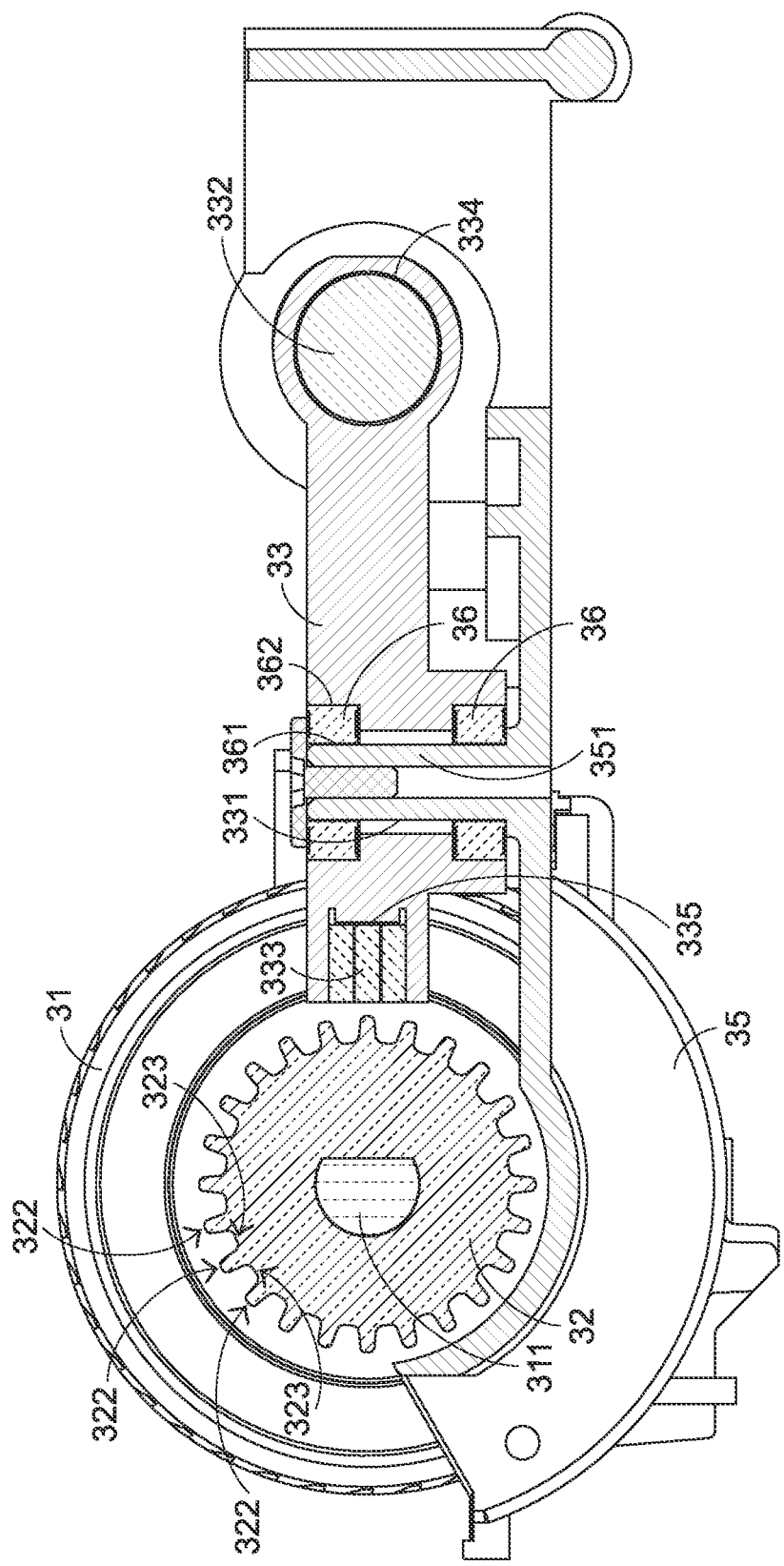
FIG. 6 is a schematic cutaway view illustrating the roller module shown in FIG. 3 and taken along the line A-A.

FIG. 1 is a schematic perspective view illustrating an input device according to a first embodiment of the present invention. FIG. 2 is a schematic exploded view illustrating the input device shown in FIG. 1. FIG. 3 is a schematic perspective view illustrating the roller module of the input device in a step scrolling mode. FIG. 4 is a schematic perspective view illustrating the roller module of the input device in a smooth scrolling mode. FIG. 5 is a schematic exploded view illustrating the roller module shown in FIG. 3. FIG. 6 is a schematic cutaway view illustrating the roller module shown in FIG. 3 and taken along the line A-A. FIG.

Figure 9:
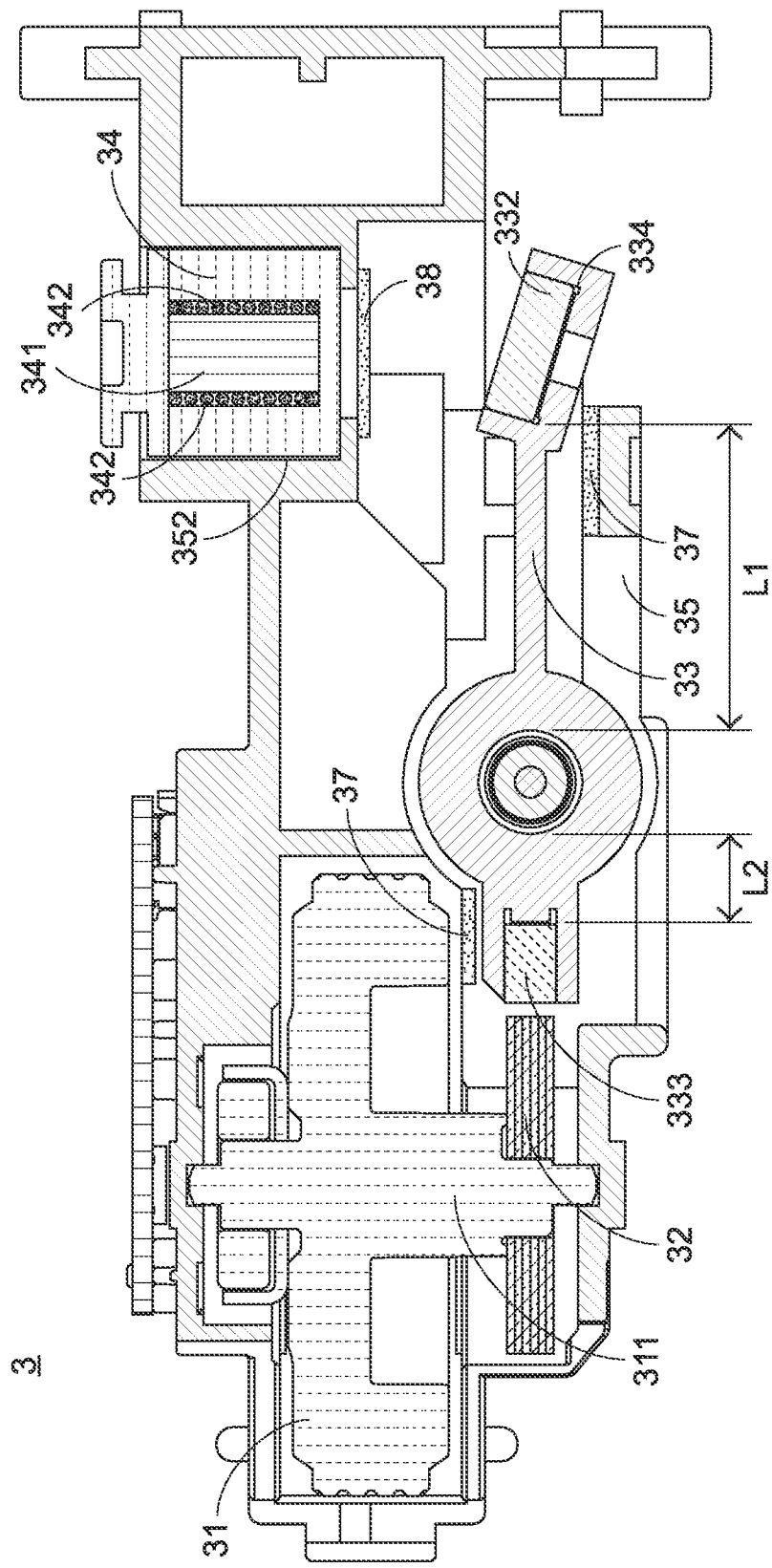
FIG. 9 is a schematic cutaway view illustrating the roller module shown in FIG. 3 and taken along the line B-B.
Figure 10:
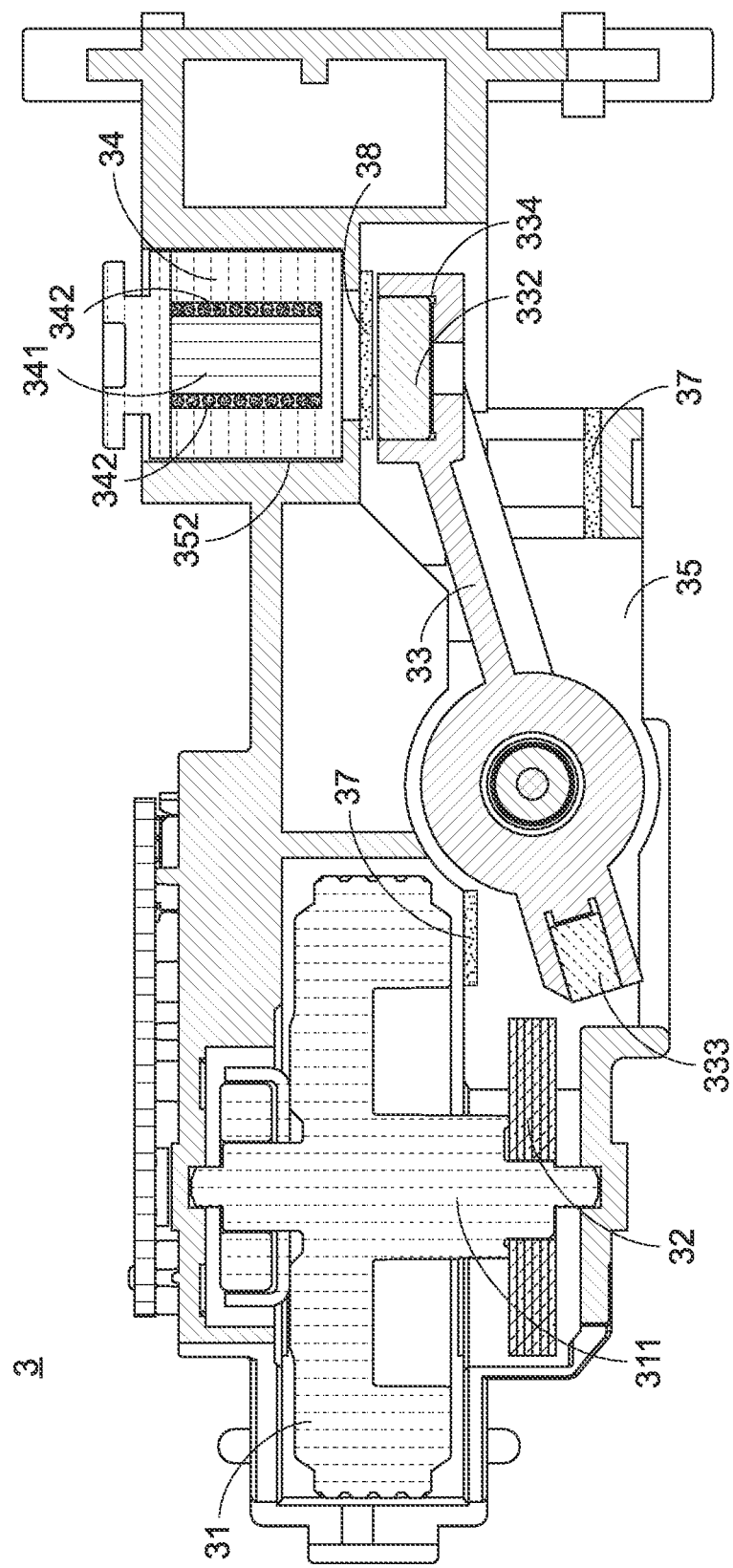
FIG. 10 is a schematic cutaway view illustrating the roller module shown in FIG. 4 and taken along the line C-C.

7 schematically illustrates a first-type pole layout structure about the relationship between the magnetization member and the second magnetic element of the roller module shown in FIG. 3. FIG. 9 is a schematic cutaway view illustrating the roller module shown in FIG. 3 and taken along the line B-B. FIG. 10 is a schematic cutaway view illustrating the roller module shown in FIG. 4 and taken along the line C-C.

Hereinafter, a mouse device is taken as an example of the input device. It is noted that the example of the input device is not restricted.

The input device 1 comprises a casing 2 and a roller module 3.

In an embodiment, the casing 2 comprises an upper cover 21 and a lower cover 22. An accommodation space 23 is formed between the upper cover 21 and the lower cover 22. The roller module 3 is disposed within the accommodation space 23. An opening 211 is formed in the upper cover 21. It is noted that numerous modifications and alterations may be made while retaining the teachings of the invention. In another embodiment, the casing 2 is composed of other parts, and the number of parts is not restricted. However, after the parts of the casing 2 are combined together, an accommodation space is defined to accommodate the roller module 3.

The roller module 3 comprises a scroll wheel 31, a magnetization member 32, a swinging element 33, a pole-reversible magnetic element 34 and a supporting seat 35. The scroll wheel 31, the magnetization member 32, the swinging element 33 and the pole-reversible magnetic element 34 are supported by the supporting seat 35. The supporting seat 35 comprises a pivotal shaft 351 and a receiving structure 352. The pivotal shaft 351 is used for installing the swinging element 33. The pole-reversible magnetic element 34 is installed and fixed within the receiving structure 352.

The scroll wheel 31 is partially exposed outside through the opening 211. Consequently, the scroll wheel 31 can be contacted with and rotated by the user. The magnetization member 32 is synchronously rotated with the scroll wheel 31. In this embodiment, a rotation shaft 311 is protruded from a rotation center of the scroll wheel 31. An end of the rotation shaft 311 is inserted into and fixed in a central channel 321 of the magnetization member 32. Consequently, the magnetization member 32 can be synchronously rotated with the scroll wheel 31.

In an embodiment, the magnetization member 32 is made of a high magnetic permeability metal. For example, the magnetization member 32 is made of silicon steel, pure iron, permalloy (iron-nickel alloy) or any other appropriate material. The magnetization member 32 has an external gear structure in appearance. The external gear structure comprises plural tooth tips 322 and plural tooth roots 323, which are alternately arranged in the radial direction. In an implementation example, the magnetization member 32 comprises plural magnetization sheets that are stacked along the axial direction. As shown in FIG. 5, the magnetization member 32 comprises six magnetization sheets 32A, 32B, 32C, 32D, 32E and 32F in a stack arrangement. Since the magnetization member 32 comprises plural magnetization sheets in the stack arrangement, the eddy current loss can be reduced.

The swinging element 33 comprises a pivotal part 331, a first magnetic element 332, a second magnetic element 333, a first receiving recess 334 and a second receiving recess 335. The pivotal part 331 is a shaft bushing. The first receiving recess 334 is used for accommodating the first magnetic element 332. The second receiving recess 335 is used for accommodating the second magnetic element 333. After the first magnetic element 332 is installed in the first receiving recess 334 and the second magnetic element 333 is installed in the second receiving recess 335, the first magnetic element 332 and the second magnetic element 333 are movable by using the pivotal part 331 as a rotation center. For example, the first magnetic element 332 and the second magnetic element 333 can be rotated in a clockwise direction or a counterclockwise direction. In this embodiment, the first magnetic element 332 is a permanent magnet.

The pivotal part 331 of the swinging element 33 is installed on the pivotal shaft 351 of the supporting seat 35. Since the pivotal part 331 of the swinging element 33 is a shaft bushing, the shaft bushing can be sheathed around the pivotal shaft 351 of the supporting seat 35. In this embodiment, the input device 1 further comprises at least one ball bearing 36 between the pivotal part 331 of the swinging element 33 and the pivotal shaft 351 of the supporting seat 35. Due to the at least one ball bearing 36, the abrasion resulted from the contact between the pivotal part 331 of the swinging element 33 and the pivotal shaft 351 of the supporting seat 35 will be reduced, and the swinging element 33 can be swung more smoothly with a reduced drag force. Each ball bearing 36 comprises an inner ring part 361 and an outer ring part 362. The inner ring part 361 is contacted with the pivotal shaft 351 of the supporting seat 35. The outer ring part 362 is contacted with the pivotal part 331 of the swinging element 33.

In the above embodiment, the pivotal part 331 of the swinging element 33 is a shaft bushing, and the supporting seat 35 is equipped with the pivotal shaft 351 corresponding to the shaft bushing. It is noted that numerous modifications and alterations may be made while retaining the teachings of the invention. In another embodiment, the swinging element 33 is equipped with a pivotal shaft, and the supporting seat 35 is equipped with a shaft bushing. Moreover, at least one ball bearing is arranged between the pivotal shaft and the shaft bushing.

The pole-reversible magnetic element 34 is installed and fixed within the receiving structure 352. Due to the interaction between the pole-reversible magnetic element 34 and the first magnetic element 332, the pole-reversible magnetic element 34 and the first magnetic element 332 are selectively attracted by each other or repelled from each other. Consequently, the second magnetic element 333 of the swinging element 33 is close to the magnetization member 32 or away from the magnetization member 32. When the second magnetic element 333 of the swinging element 33 is away from the magnetization member 32, the scroll wheel 31 is rotated in a smooth scrolling mode (or a stepless scrolling mode). When the second magnetic element 333 of the swinging element 33 is close to the magnetization member 32, the magnetic attraction force between the second magnetic element 333 and the plural tooth tips 322 of the magnetization member 32 is larger than the magnetic attraction force between the second magnetic element 333 and the plural tooth roots 323 of the magnetization member 32. Consequently, the scroll wheel 31 is rotated in a step scrolling mode (or a ratchet scrolling mode).

Especially, the rotation of the scroll wheel 31 may provide a step scrolling feel to the user when the second magnetic element 333 of the swinging element 33 is close to the magnetization member 32. The principles of generating the step scrolling feel will be described as follows. As mentioned above, the second magnetic element 333 is closer to the tooth tips 322 of the magnetization member 32, and the second magnetic element 333 is farther away from the plural tooth roots 323 of the magnetization member 32. Since the plural tooth tips 322 and plural tooth roots 323 of the magnetization member 32 are alternately arranged, the magnetic attraction force between the magnetization member 32 and the nearby second magnetic element 333 is subjected to sudden change between the high and low levels during the rotation of the scroll wheel 31. Consequently, the step scrolling feedback is provided. On the other hand, when the second magnetic element 333 of the swinging element 33 is away from the magnetization member 32, the magnetic attraction force between the second magnetic element 333 and the tooth tips 322 and the magnetic attraction force between the second magnetic element 333 and the tooth roots 323 are nearly equal and very weak. Consequently, the rotation of the scroll wheel 31 will not result in the step scrolling feedback. That is, the step scrolling feel is very weak. Under this circumstance, the scroll wheel 31 is rotated in the smooth scrolling mode.

In order to increase the magnetic attraction force between the second magnetic element 333 and the magnetization member 32, the pole layout structure is specially designed, and the second magnetic element 333 comprises at least three magnets.

Figure 7:
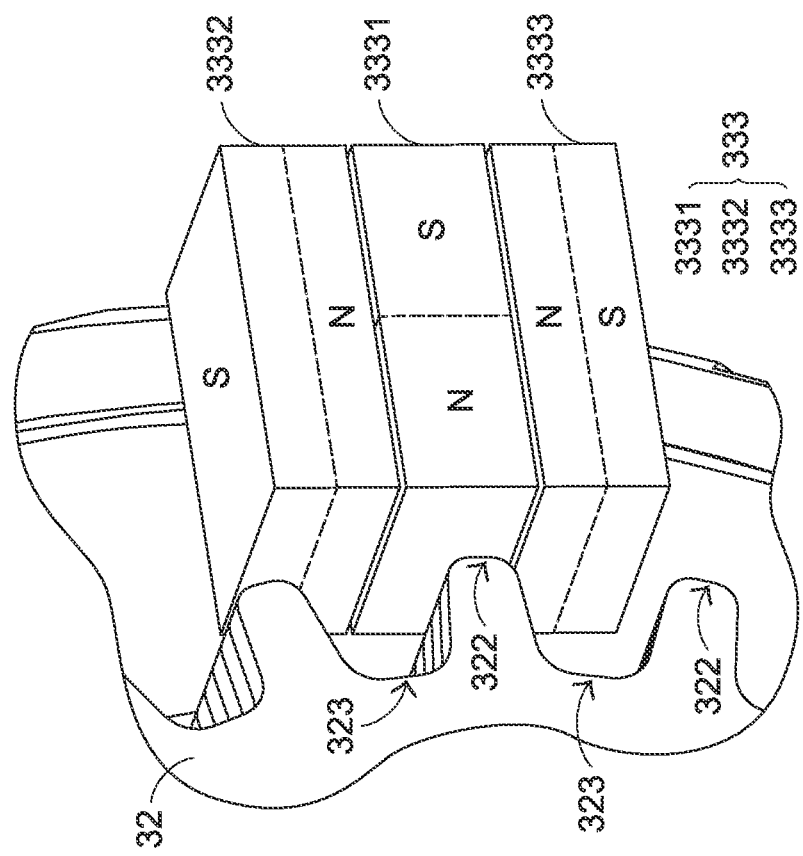
FIG. 7 schematically illustrates a first-type pole layout structure about the relationship between the magnetization member and the second magnetic element of the roller module shown in FIG. 3.

In the implementation example of FIG. 7, the second magnetic element 333 comprises a first magnet 3331, a second magnet 3332 and a third magnet 3333, which are arranged in a stack form. The second magnet 3332 is stacked on the top side of the first magnet 3331. The third magnet 3333 is stacked on the bottom side of the first magnet 3331. The pole layout structure will be described in more details as follows.

The S-pole terminal and the N-pole terminal of the first magnet 3331 are arranged along the horizontal direction. In addition, the S-pole terminal of the first magnet 3331 is close to a tooth tip 322 of the plural tooth tips 322 of the magnetization member 32. The S-pole terminal and the N-pole terminal of the second magnet 3332 are arranged along the vertical direction. In addition, the S-pole terminal of the second magnet 3332 faces the first magnet 3331. The S-pole terminal and the N-pole terminal of the third magnet 3333 are arranged along the vertical direction. In addition, the S-pole terminal of the third magnet 3333 faces the first magnet 3331. Due to the arrangement of the second magnet 3332 and the third magnet 3333, the magnetic attraction force between the tooth tips 322 of the magnetization member 32 and the first magnet 3331 will be strengthened. Consequently, while the scroll wheel 31 is rotated, a strong step scrolling feel will provide to the user. In an embodiment, the first magnet 3331, the second magnet 3332 and the third magnet 3333 are permanent magnets.

In some other embodiments, the N-pole terminal of the first magnet 3331 is close to a tooth tip 322 of the plural tooth tips 322 of the magnetization member 32. In other words, the pole layout structure is changed.

Figure 8:
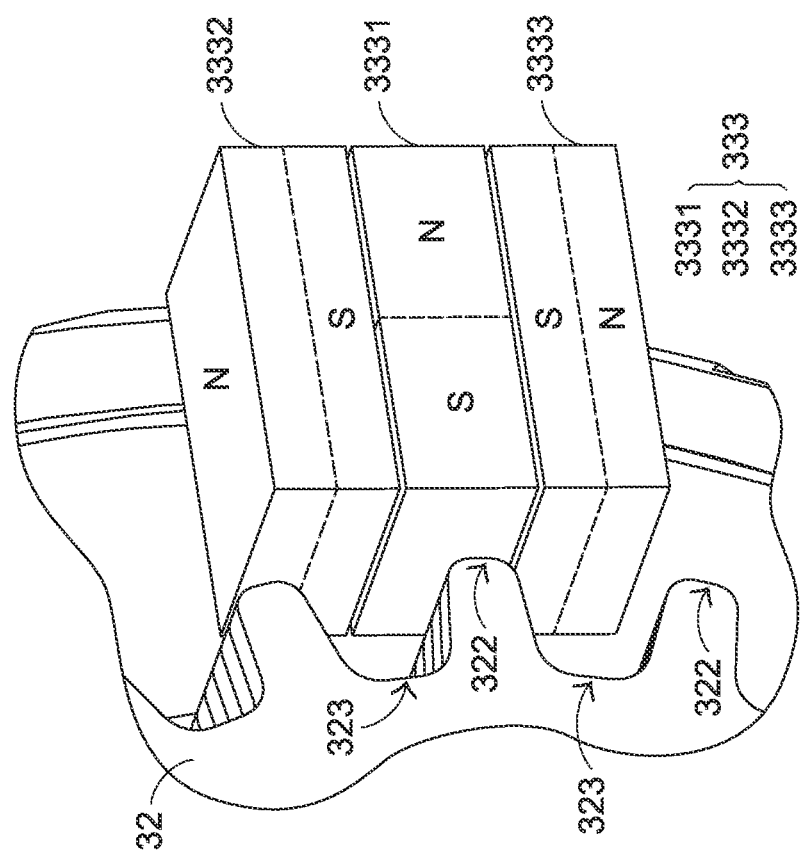
FIG. 8 schematically illustrates a second-type pole layout structure about the relationship between the magnetization member and the second magnetic element of the roller module shown in FIG. 3.

FIG. 8 schematically illustrates a second-type pole layout structure about the relationship between the magnetization member and the second magnetic element of the roller module shown in FIG. 3. In the implementation example of FIG. 8, the second magnetic element 333 comprises a first magnet 3331, a second magnet 3332 and a third magnet 3333, which are arranged in a stack form. The second magnet 3332 is stacked on the top side of the first magnet 3331. The third magnet 3333 is stacked on the bottom side of the first magnet 3331. The pole layout structure will be described as follows.

The S-pole terminal and the N-pole terminal of the first magnet 3331 are arranged along the horizontal direction. In addition, the N-pole terminal of the first magnet 3331 is close to a tooth tip 322 of the plural tooth tips 322 of the magnetization member 32. The S-pole terminal and the N-pole terminal of the second magnet 3332 are arranged along the vertical direction. In addition, the N-pole terminal of the second magnet 3332 faces the first magnet 3331. The S-pole terminal and the N-pole terminal of the third magnet 3333 are arranged along the vertical direction. In addition, the N-pole terminal of the third magnet 3333 faces the first magnet 3331. Due to the arrangement of the second magnet 3332 and the third magnet 3333, the magnetic attraction force between the tooth tips 322 of the magnetization member 32 and the first magnet 3331 will be strengthened.

The pole-reversible magnetic element 34 comprises a magnetic core 341 and a coil 342. The magnetic core 341 is made of a magnetic material. By applying an external strong magnetic field to the magnetic material, the magnetic direction of the magnetic field is changed, and a certain residual magnetism is retained. For example, the magnetic core 341 is an alnico magnet. The coil 342 is wound around the magnetic core 341. When no electric current flows through the coil 342 or no electric current is provided from the input device 1 to the coil 342, the pole layout of the pole-reversible magnetic element 34 is determined according to the original pole layout of the magnetic core 341. When an electric current flows through the coil 342 or an electric current is provided from the input device 1 to the coil 342, the magnetic field generated by the coil 342 is larger than the coercivity of the magnetic core 341. Consequently, the pole layout of the pole-reversible magnetic element 34 is opposite to the pole layout of the magnetic core 341. In other words, the poles are reversed.

The input device 1 further comprises a power supply unit 4. The power supply unit 4 is disposed within the input device 1. In addition, the power supply unit 4 is electrically connected with the pole-reversible magnetic element 34 to provide the electric current to the coil 342. The input device 1 further comprises a control unit 5 and a switching button 6. The roller module 3 is switched between the step scrolling mode and the smooth scrolling mode through the control unit 5 and the switching button 6. The switching button 6 is electrically connected with the control unit 5, or the switching button 6 is in communication with the control unit 5. The switching button 6 is exposed outside the casing 2 of the input device 1 so as to be operated by the user. For example, the switching button 6 is partially exposed outside the input device 1 through the opening 211. After the switching button 6 is triggered by the user, the pole-reversible magnetic element 34 and the first magnetic element 332 interact with each other. Consequently, the scroll wheel 31 can be switched between the step scrolling mode and the smooth scrolling mode.

Figure 11:
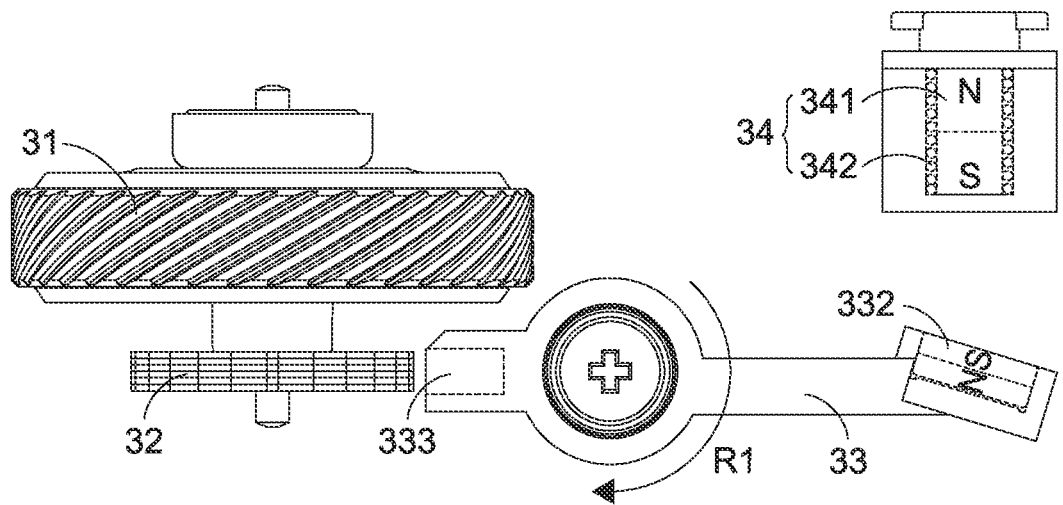
FIG. 11 schematically illustrates the repulsive interaction and the separation between the pole-reversible magnetic element and the first magnetic element of the roller module according to the first embodiment of the present invention.
Figure 12:
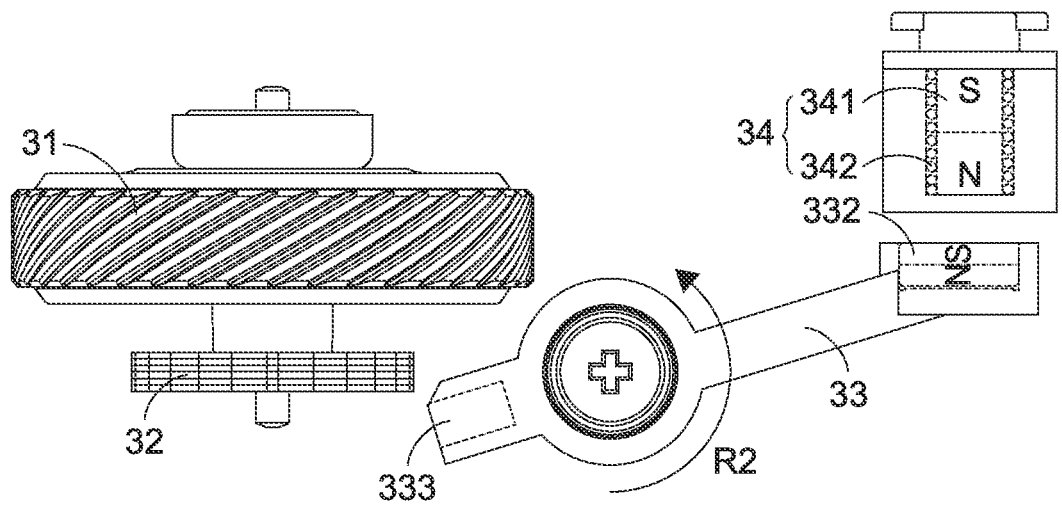
FIG. 12 schematically illustrates the attractive interaction and the approach between the pole-reversible magnetic element and the first magnetic element of the roller module according to the first embodiment of the present invention.

Hereinafter, two scenarios of the interaction between the pole-reversible magnetic element 34 and the first magnetic element 332 will be described with reference to FIGS. 11 and 12. FIG. 11 schematically illustrates the repulsive interaction and the separation between the pole-reversible magnetic element and the first magnetic element of the roller module according to the first embodiment of the present invention. FIG. 12 schematically illustrates the attractive interaction and the approach between the pole-reversible magnetic element and the first magnetic element of the roller module according to the first embodiment of the present invention. In this embodiment, the first magnetic element 332 comprises an S-pole terminal and an N-pole terminal. The S-pole terminal of the first magnetic element 332 faces the magnetic core 341 of the pole-reversible magnetic element 34. The magnetic core 341 of the pole-reversible magnetic element 34 comprises an S-pole terminal and an N-pole terminal. The S-pole terminal of the pole-reversible magnetic element 34 faces the first magnetic element 332.

Please refer to FIG. 11. When no electric current flows through the coil 342 of the pole-reversible magnetic element 34, the pole layout of the pole-reversible magnetic element 34 is determined according to the original pole layout of the magnetic core 341. That is, the S-pole terminal of the pole-reversible magnetic element 34 faces the first magnetic element 332. Under this circumstance, the pole-reversible magnetic element 34 and the first magnetic element 332 are separated from each other in response to the magnetic repulsive force therebetween. As shown in FIG. 5 and FIG. 9, the pole-reversible magnetic element 34 has been installed and fixed within the receiving structure 352. Consequently, as shown in FIG. 11, the first magnetic element 332 of the swinging element 33 is moved in a first rotation direction R1. Correspondingly, the second magnetic element 333 is also moved in the first rotation direction R1 and then moved to the position near the magnetization member 32.

Please refer to FIG. 12. When an electric current flows through the coil 342 of the pole-reversible magnetic element 34, the pole layout of the pole-reversible magnetic element 34 is opposite to the pole layout of the magnetic core 341. That is, the N-pole terminal of the pole-reversible magnetic element 34 faces the first magnetic element 332. Under this circumstance, the pole-reversible magnetic element 34 and the first magnetic element 332 are moved in the direction close to each other in response to the magnetic attraction force therebetween. As shown in FIG. 5 and FIG. 10, the pole-reversible magnetic element 34 has been installed and fixed within the receiving structure 352. Consequently, as shown in FIG. 12, the first magnetic element 332 of the swinging element 33 is moved in a second rotation direction R2. Correspondingly, the second magnetic element 333 is also moved in the second rotation direction R2 and then moved to the position away from the magnetization member 32. The second rotation direction R2 is opposite to the first rotation direction R1.

The scenarios of the interaction between the pole-reversible magnetic element 34 and the first magnetic element 332 are not restricted. In other words, the scenarios of the interaction between the pole-reversible magnetic element 34 and the first magnetic element 332 may be varied according to the practical requirements.

Figure 13:
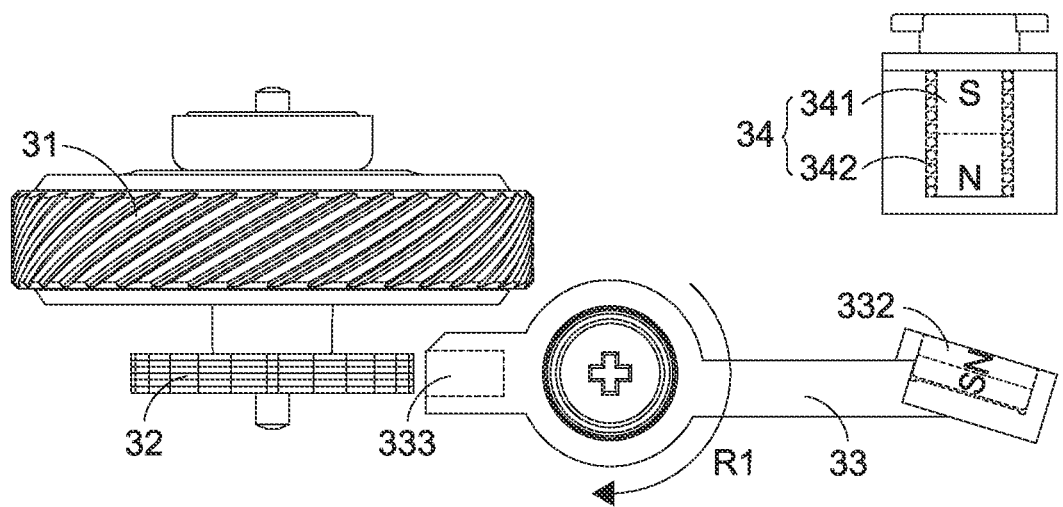
FIG. 13 schematically illustrates the repulsive interaction and the separation between the pole-reversible magnetic element and the first magnetic element of the roller module according to a variant example of the first embodiment of the present invention.
Figure 14:
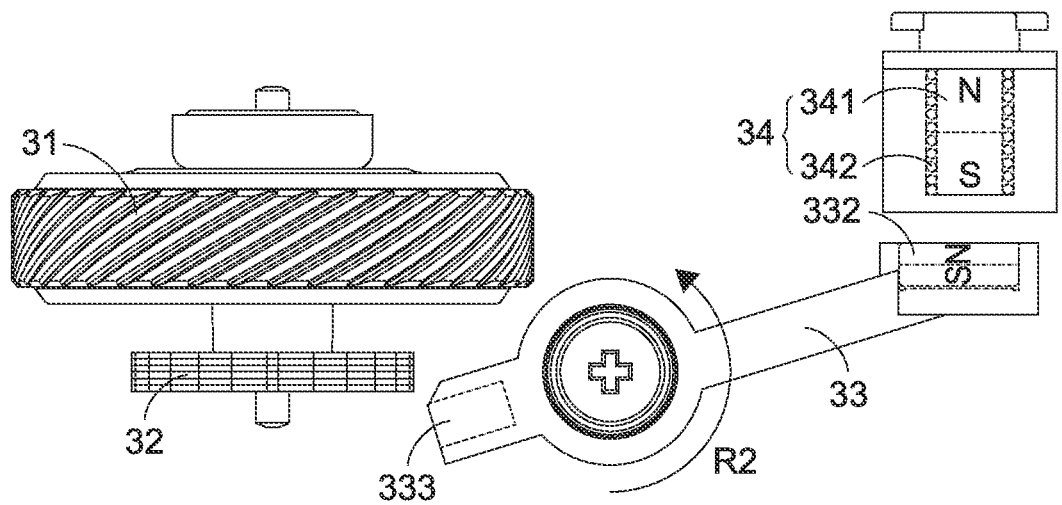
FIG. 14 schematically illustrates the attractive interaction and the approach between the pole-reversible magnetic element and the first magnetic element of the roller module according to a variant example of the first embodiment of the present invention.

Hereinafter, two other scenarios of the interaction between the pole-reversible magnetic element 34 and the first magnetic element 332 will be described with reference to FIGS. 13 and 14. FIG. 13 schematically illustrates the repulsive interaction and the separation between the pole-reversible magnetic element and the first magnetic element of the roller module according to a first variant example of the first embodiment of the present invention. FIG. 14 schematically illustrates the attractive interaction and the approach between the pole-reversible magnetic element and the first magnetic element of the roller module according to the first variant example of the first embodiment of the present invention. In this embodiment, the first magnetic element 332 comprises an S-pole terminal and an N-pole terminal. The N-pole terminal of the first magnetic element 332 faces the magnetic core 341 of the pole-reversible magnetic element 34. The magnetic core 341 of the pole-reversible magnetic element 34 comprises an S-pole terminal and an N-pole terminal. The N-pole terminal of the pole-reversible magnetic element 34 faces the first magnetic element 332.

Please refer to FIG. 13. When no electric current flows through the coil 342 of the pole-reversible magnetic element 34, the N-pole terminal of the pole-reversible magnetic element 34 faces the first magnetic element 332. Under this circumstance, the pole-reversible magnetic element 34 and the first magnetic element 332 are separated from each other in response to the magnetic repulsive force therebetween.

Please refer to FIG. 14. When an electric current flows through the coil 342 of the pole-reversible magnetic element 34, the pole layout of the pole-reversible magnetic element 34 is reversed. That is, the S-pole terminal of the pole-reversible magnetic element 34 faces the first magnetic element 332. Under this circumstance, the pole-reversible magnetic element 34 and the first magnetic element 332 are moved in the direction close to each other in response to the magnetic attraction force therebetween.

In some other variant examples shown in FIGS. 15 to 18, the relative locations of the first magnetic element 332 and the pole-reversible magnetic element 34 are exchanged with each other. For example, the location of the receiving structure 352 of the supporting seat 35 for accommodating the pole-reversible magnetic element 34 is adjusted. In these variant examples, the pole-reversible magnetic element 34 is located beside another side of the first magnetic element 332. Correspondingly, the opening side of the first receiving recess 334 of the swinging element 33 for accommodating the first magnetic element 332 is adjusted.

Figure 15:
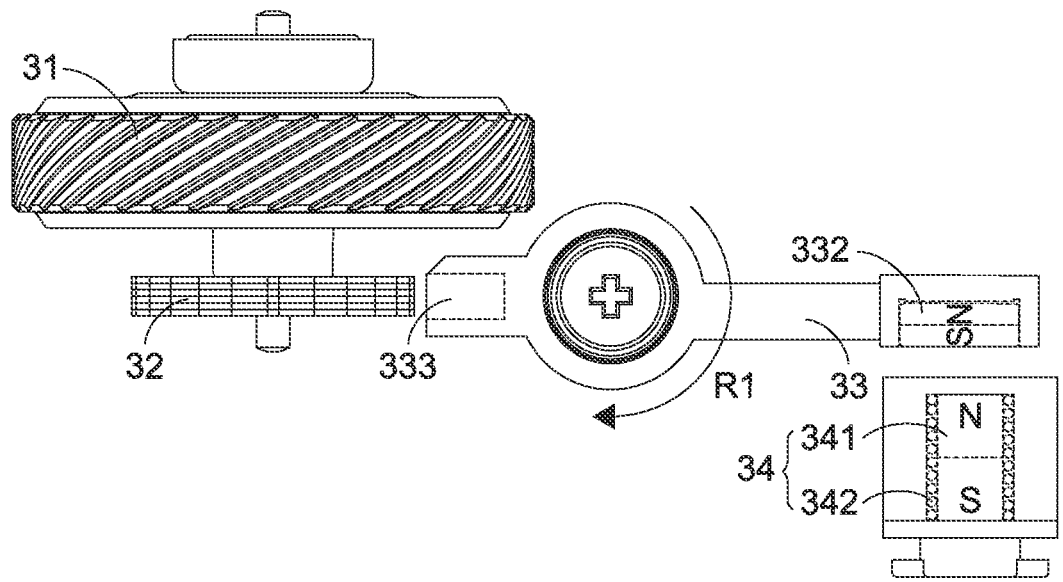
FIG. 15 schematically illustrates the repulsive interaction and the separation between the pole-reversible magnetic element and the first magnetic element of the roller module according to a second variant example of the first embodiment of the present invention.
Figure 16:
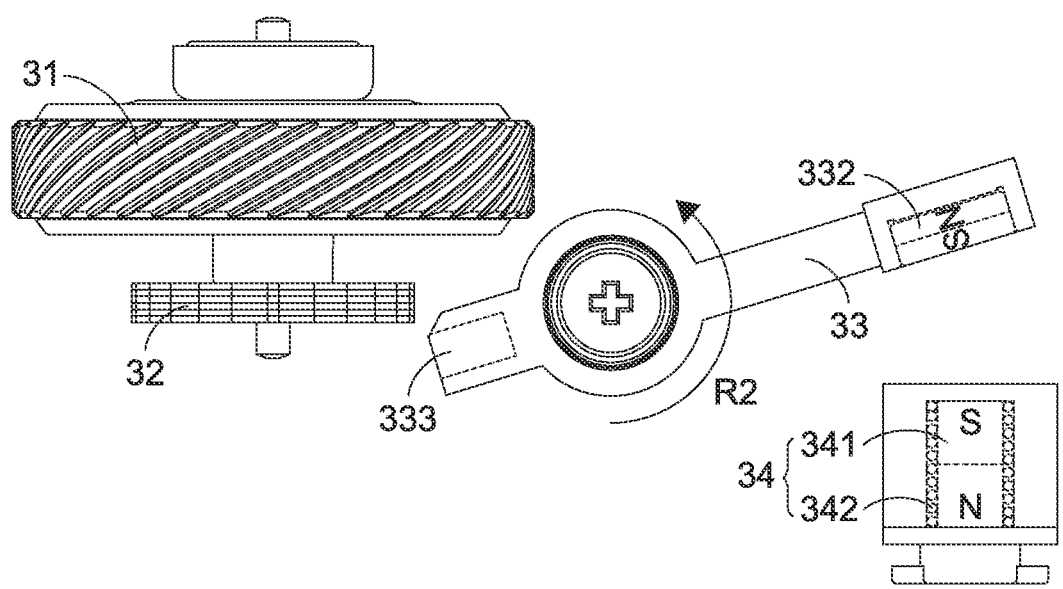
FIG. 16 schematically illustrates the attractive interaction and the approach between the pole-reversible magnetic element and the first magnetic element of the roller module according to the second variant example of the second embodiment of the present invention.

FIG. 15 schematically illustrates the repulsive interaction and the separation between the pole-reversible magnetic element and the first magnetic element of the roller module according to a second variant example of the first embodiment of the present invention. FIG. 16 schematically illustrates the attractive interaction and the approach between the pole-reversible magnetic element and the first magnetic element of the roller module according to the second variant example of the second embodiment of the present invention. In the variant example of FIGS. 15 and 16, the locations of the first magnetic element 332 and the pole-reversible magnetic element 34 are exchanged with each other. In this embodiment, the first magnetic element 332 comprises an S-pole terminal and an N-pole terminal. The S-pole terminal of the first magnetic element 332 faces the magnetic core 341 of the pole-reversible magnetic element 34. The magnetic core 341 of the pole-reversible magnetic element 34 comprises an S-pole terminal and an N-pole terminal. The N-pole terminal of the pole-reversible magnetic element 34 faces the first magnetic element 332.

Please refer to FIG. 15. When no electric current flows through the coil 342 of the pole-reversible magnetic element 34, the N-pole terminal of the pole-reversible magnetic element 34 faces the first magnetic element 332. Under this circumstance, the pole-reversible magnetic element 34 and the first magnetic element 332 are moved in the direction close to each other in response to the magnetic attraction force therebetween.

Please refer to FIG. 16. When an electric current flows through the coil 342 of the pole-reversible magnetic element 34, the pole layout of the pole-reversible magnetic element 34 is reversed. That is, the S-pole terminal of the pole-reversible magnetic element 34 faces the first magnetic element 332. Under this circumstance, the pole-reversible magnetic element 34 and the first magnetic element 332 are separated from each other in response to the magnetic repulsive force therebetween.

Figure 17:
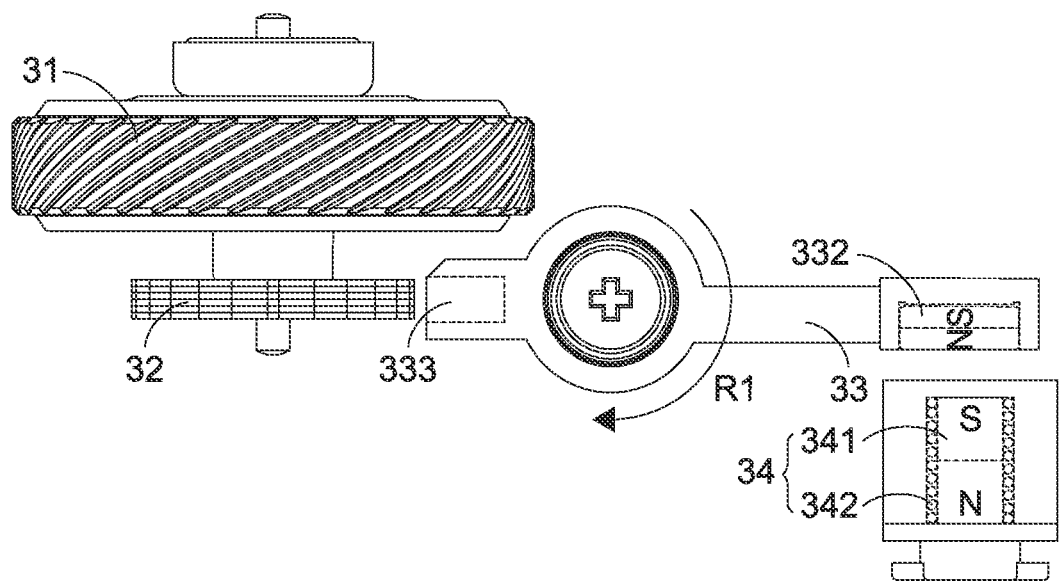
FIG. 17 schematically illustrates the repulsive interaction and the separation between the pole-reversible magnetic element and the first magnetic element of the roller module according to a third variant example of the first embodiment of the present invention.
Figure 18:
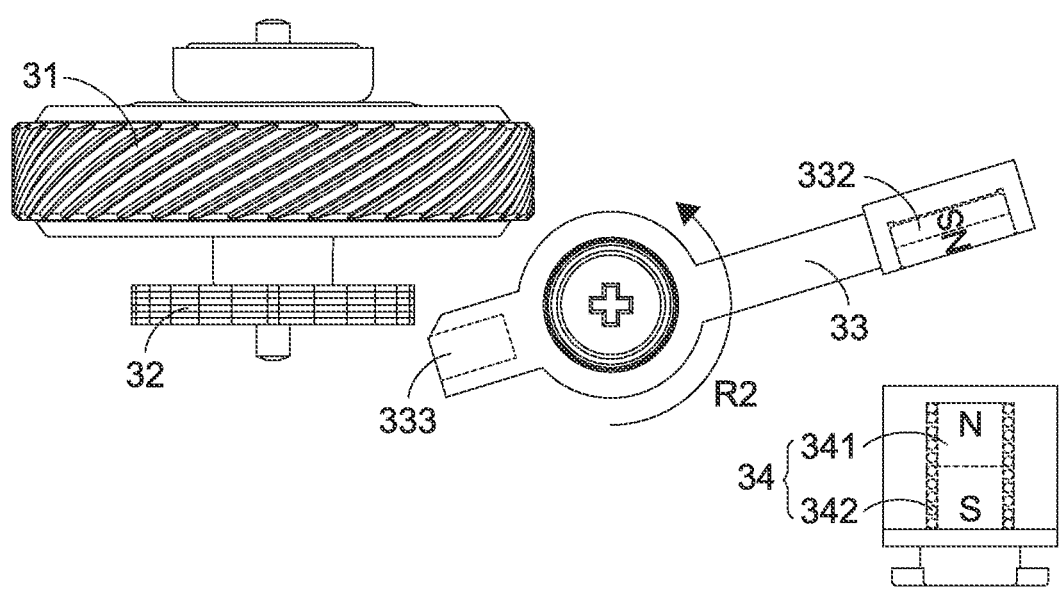
FIG. 18 schematically illustrates the attractive interaction and the approach between the pole-reversible magnetic element and the first magnetic element of the roller module according to the third variant example of the second embodiment of the present invention.

FIG. 17 schematically illustrates the repulsive interaction and the separation between the pole-reversible magnetic element and the first magnetic element of the roller module according to a third variant example of the first embodiment of the present invention. FIG. 18 schematically illustrates the attractive interaction and the approach between the pole-reversible magnetic element and the first magnetic element of the roller module according to the third variant example of the second embodiment of the present invention. In the variant example of FIGS. 17 and 18, the first magnetic element 332 comprises an S-pole terminal and an N-pole terminal. The N-pole terminal of the first magnetic element 332 faces the magnetic core 341 of the pole-reversible magnetic element 34. The magnetic core 341 of the pole-reversible magnetic element 34 comprises an S-pole terminal and an N-pole terminal. The S-pole terminal of the pole-reversible magnetic element 34 faces the first magnetic element 332.

Please refer to FIG. 17. When no electric current flows through the coil 342 of the pole-reversible magnetic element 34, the S-pole terminal of the pole-reversible magnetic element 34 faces the first magnetic element 332. Under this circumstance, the pole-reversible magnetic element 34 and the first magnetic element 332 are moved in the direction close to each other in response to the magnetic attraction force therebetween.

Please refer to FIG. 18. When an electric current flows through the coil 342 of the pole-reversible magnetic element 34, the pole layout of the pole-reversible magnetic element 34 is reversed. That is, the N-pole terminal of the pole-reversible magnetic element 34 faces the first magnetic element 332. Under this circumstance, the pole-reversible magnetic element 34 and the first magnetic element 332 are separated from each other in response to the magnetic repulsive force therebetween.

In some embodiments, the structure of the swinging element 33 is modified. For example, the distance between the first magnetic element 332 and the pivotal part 331 is longer than the distance between the second magnetic element 333 and the pivotal part 331. Consequently, when the pole-reversible magnetic element 34 and the first magnetic element 332 interact with each other, it is easier to push the second magnetic element 333 toward the magnetization member 32 or separate the magnetization member 32 and the second magnetic element 333 from each other. Since the torques corresponding to different distances are different, the scroll wheel 31 can be switched between the step scrolling mode and the smooth scrolling mode with small electricity quantity. Consequently, the power-saving efficacy is enhanced.

When the operating mode of the scroll wheel 31 is switched to the step scrolling mode or the smooth scrolling mode, the collision between the swinging element 33 and the supporting seat 35 may generate noises. For reducing the influence of the collision, reducing the generated noise and increasing the user's confidence in the product, the roller module 3 further comprises a buffering structure 37 between the supporting seat 35 and the swinging element 33. For example, the buffering structure 37 is made of foam or silicone. In addition, the buffering structure 37 is installed on the supporting seat 35 or the swinging element 33. As long as the supporting seat 35 and the swinging element 33 are not in direct contact with each other, the installation locations of the supporting seat 35 and the swinging element 33 are not restricted.

Similarly, when the pole-reversible magnetic element 34 and the first magnetic element 332 are magnetically attracted by each other in response to the magnetic attraction force, the collision between the pole-reversible magnetic element 34 and the first magnetic element 332 may generate noises. For reducing the influence of the collision, reducing the generated noise and increasing the user's confidence in the product, the roller module 3 further comprises a buffering structure 38 between the pole-reversible magnetic element 34 and the first magnetic element 332. For example, the buffering structure 38 is installed on an outer surface of the first receiving recess 334 of the swinging element 33, installed on the exposed part of the first magnetic element 332 or installed on an outer surface of the receiving structure 352 of the supporting seat 35.

In the first embodiment, the magnetization member 32 is installed on the rotation shaft 311 of the scroll wheel 31. In addition, there is a spacing interval between the magnetization member 32 and the rotation shaft 311 of the scroll wheel 31. In some other embodiments, the magnetization member 32 is directly installed in the inner space of the scroll wheel 31. Due to this structural design, the magnetization member 32 and the scroll wheel 31 can be also synchronously rotated with each other.

Figure 19:
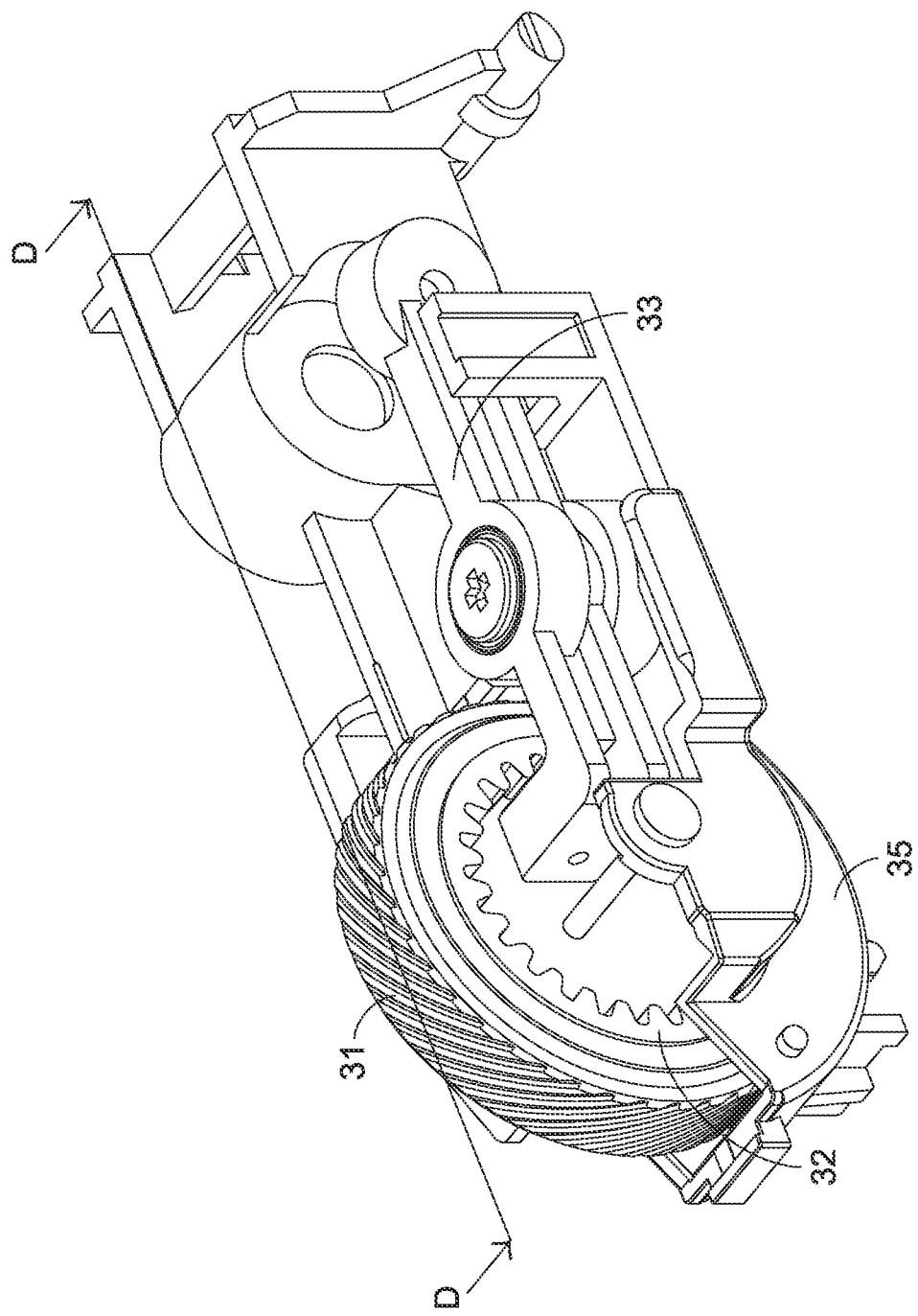
FIG. 19 is a schematic perspective view illustrating a roller module according to a second embodiment of the present invention.
Figure 20:
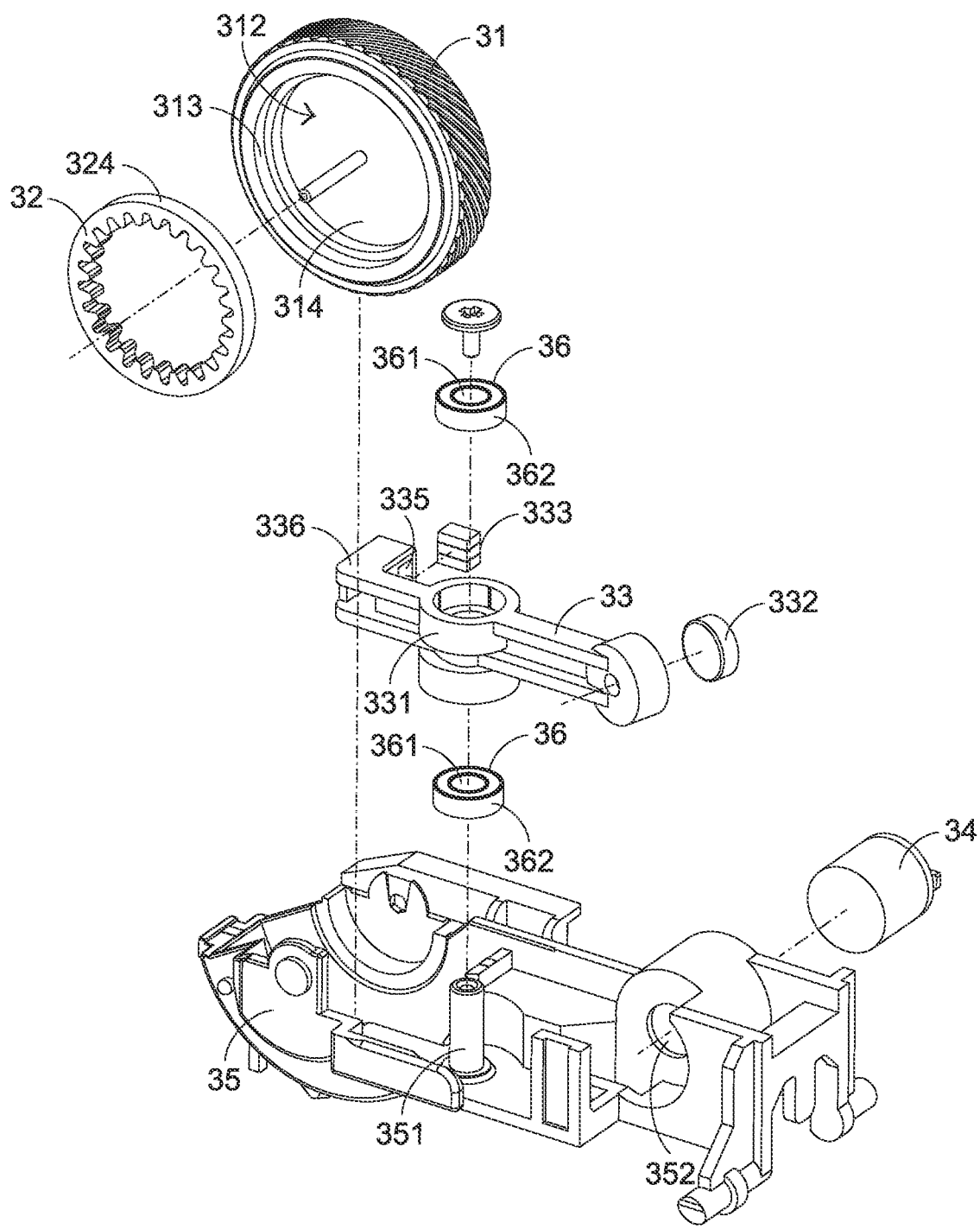
FIG. 20 is a schematic exploded view illustrating the roller module shown in FIG. 19.
Figure 21:
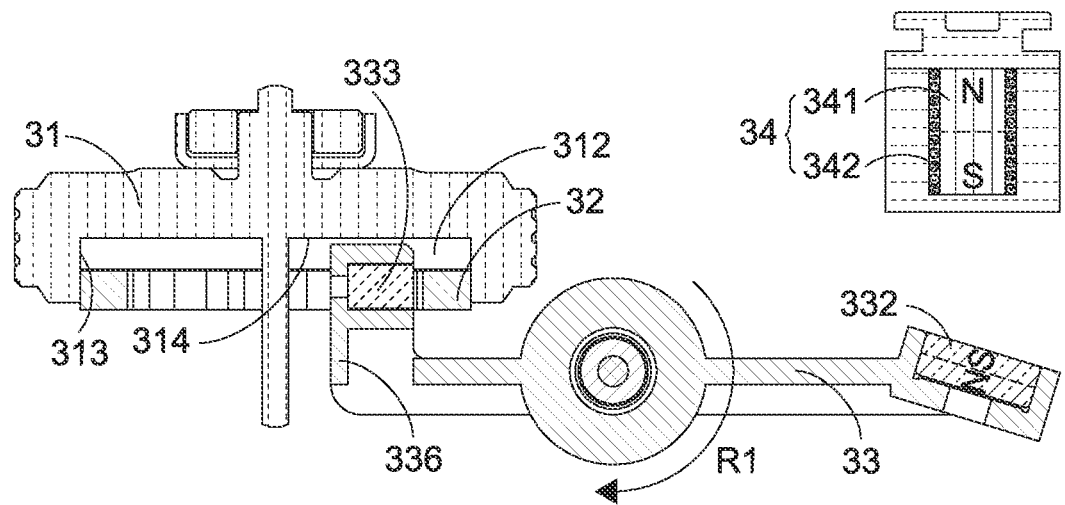
FIG. 21 schematically illustrates the repulsive interaction and the separation between the pole-reversible magnetic element and the first magnetic element of the roller module shown in FIG. 19.
Figure 22:
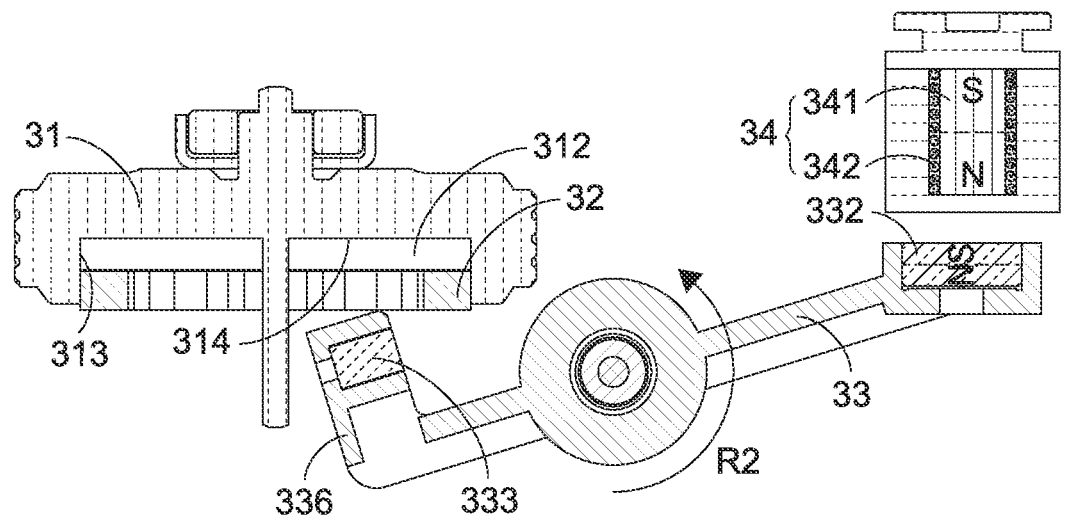
FIG. 22 schematically illustrates the attractive interaction and the approach between the pole-reversible magnetic element and the first magnetic element of the roller module shown in FIG. 19.
Figure 23:
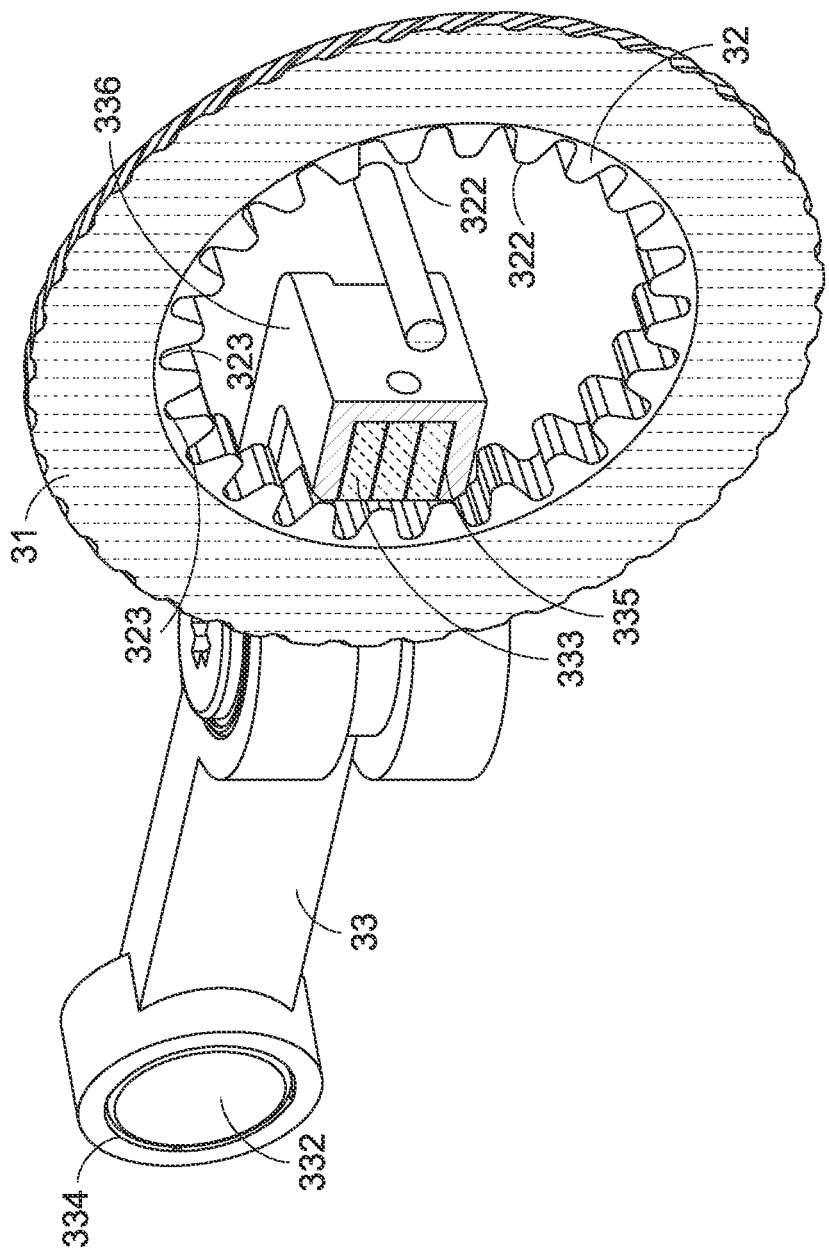
FIG. 23 is a schematic cutaway view illustrating the roller module shown in FIG. 19 and taken along the line D-D.

A roller module according to a second embodiment of the present invention and an input device with the roller module will be illustrated with reference to FIGS. 19 to 23. FIG. 19 is a schematic perspective view illustrating a roller module according to a second embodiment of the present invention. FIG. 20 is a schematic exploded view illustrating the roller module shown in FIG. 19. FIG. 21 schematically illustrates the repulsive interaction and the separation between the pole-reversible magnetic element and the first magnetic element of the roller module shown in FIG. 19. FIG. 22 schematically illustrates the attractive interaction and the approach between the pole-reversible magnetic element and the first magnetic element of the roller module shown in FIG. 19. FIG. 23 is a schematic cutaway view illustrating the roller module shown in FIG. 19 and taken along the line D-D. In comparison with the first embodiment, the installation of the magnetization member 32 of this embodiment is distinguished. In this embodiment, the magnetization member 32 is directly installed in the inner space of the scroll wheel 31. In addition, the second magnetic element 333 of the swinging element 33 is inserted into the inner space of the scroll wheel 31. Consequently, the second magnetic element 333 of the swinging element 33 and the magnetization member 32 can interact with each other.

In this embodiment, the scroll wheel 31 comprises a concave structure 312. The concave structure 312 is defined by an inner ring surface 313 and an inner wall 314 collaboratively.

In this embodiment, the magnetization member 32 has an internal gear structure in appearance. The external gear structure comprises plural tooth tips 322 and plural tooth roots 323, which are alternately arranged in the radial direction. The magnetization member 32 has an outer ring surface 324. When the magnetization member 32 is disposed within the scroll wheel 31, the outer ring surface 324 of the magnetization member 32 is fixed on the inner ring surface 313 of the scroll wheel 31.

In an implementation example, the magnetization member 32 is a one-piece structure. Alternatively, the magnetization member 32 comprises plural magnetization sheets that are stacked along the axial direction.

In this embodiment, the swinging element 33 comprises a bent structure 336. The second receiving recess 335 is formed in the bent structure 336. The second receiving recess 335 is used for accommodating the second magnetic element 333. In addition, the second receiving recess 335 is open to the magnetization member 32 in the radial direction.

Of course, the scenarios of the interaction between the first magnetic element 332 and the pole-reversible magnetic element 34 shown in FIGS. 13 to 18 may be applied to the roller module 3 of this embodiment.

Please refer to FIGS. 21 and 22. In this embodiment, the first magnetic element 332 comprises an S-pole terminal and an N-pole terminal. The S-pole terminal of the first magnetic element 332 faces the magnetic core 341 of the pole-reversible magnetic element 34. The magnetic core 341 of the pole-reversible magnetic element 34 comprises an S-pole terminal and an N-pole terminal. The S-pole terminal of the pole-reversible magnetic element 34 faces the first magnetic element 332.

When no electric current flows through the coil 342 of the pole-reversible magnetic element 34, the pole layout of the pole-reversible magnetic element 34 is determined according to the original pole layout of the magnetic core 341. That is, the S-pole terminal of the pole-reversible magnetic element 34 faces the first magnetic element 332. Under this circumstance, the pole-reversible magnetic element 34 and the first magnetic element 332 are separated from each other in response to the repulsive force therebetween. Consequently, as shown in FIG. 21, the first magnetic element 332 of the swinging element 33 is moved in a first rotation direction R1. Correspondingly, the second magnetic element 333 on the bent structure 336 is moved in the first rotation direction R1, then inserted into the concave structure 312 of the scroll wheel 31, and finally moved to the position near the magnetization member 32.

When an electric current flows through the coil 342 of the pole-reversible magnetic element 34, the pole layout of the pole-reversible magnetic element 34 is opposite to the pole layout of the magnetic core 341. That is, the N-pole terminal of the pole-reversible magnetic element 34 faces the first magnetic element 332. Under this circumstance, the pole-reversible magnetic element 34 and the first magnetic element 332 are moved in the direction close to each other in response to the magnetic attraction force therebetween. Consequently, as shown in FIG. 22, the first magnetic element 332 of the swinging element 33 is moved in a second rotation direction R2. Correspondingly, the second magnetic element 333 on the bent structure 336 is also moved in the second rotation direction R2 and then moved to the position away from the magnetization member 32. The second rotation direction R2 is opposite to the first rotation direction R1.

In order to increase the magnetic attraction force between the second magnetic element 333 and the magnetization member 32, the pole layout structure is specially designed. Like the first embodiment of FIG. 8, the second magnetic element 333 comprises at least three magnets. The pole layout structure is similar to that of FIG. 8.

A roller module according to a third embodiment of the present invention and an input device with the roller module will be illustrated with reference to FIGS. 24 to 28.

Figure 24:
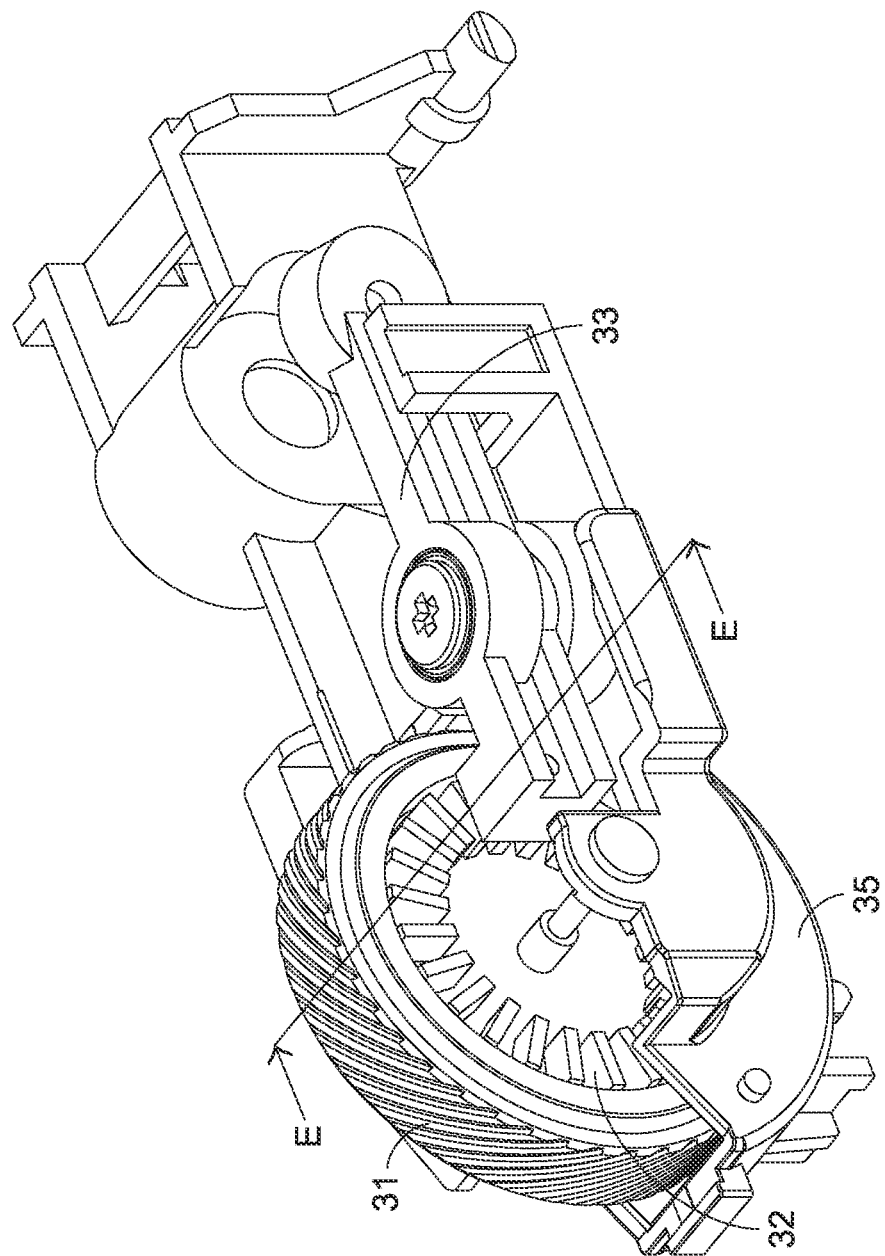
FIG. 24 is a schematic perspective view illustrating a roller module according to a third embodiment of the present invention.
Figure 25:
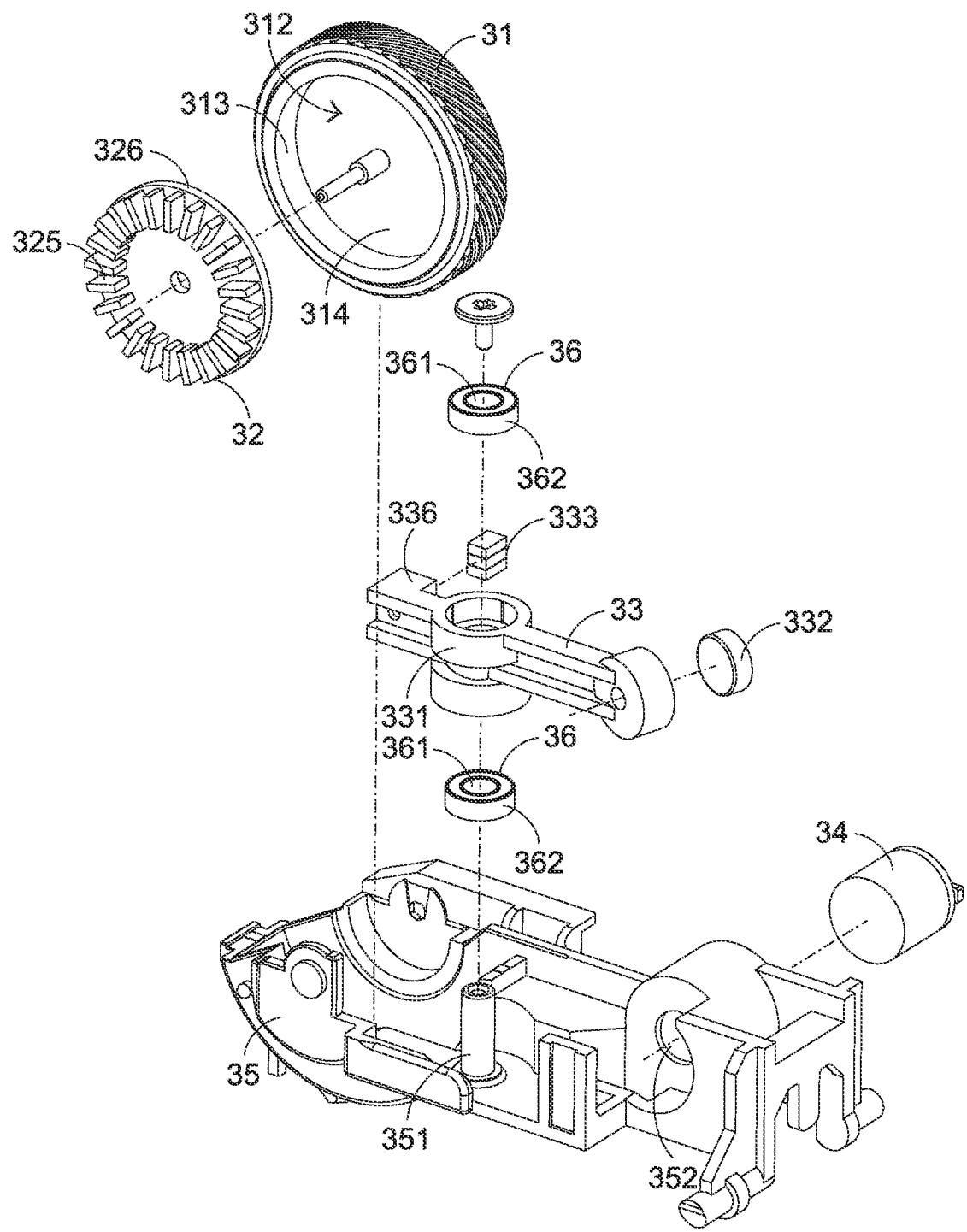
FIG. 25 is a schematic exploded view illustrating the roller module shown in FIG. 24.
Figure 26:
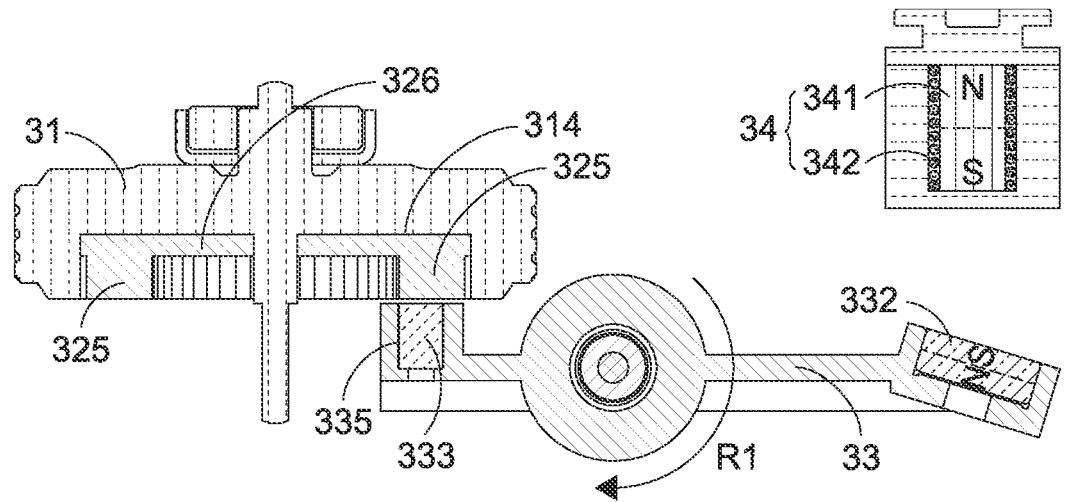
FIG. 26 schematically illustrates the repulsive interaction and the separation between the pole-reversible magnetic element and the first magnetic element of the roller module shown in FIG. 24.
Figure 27:
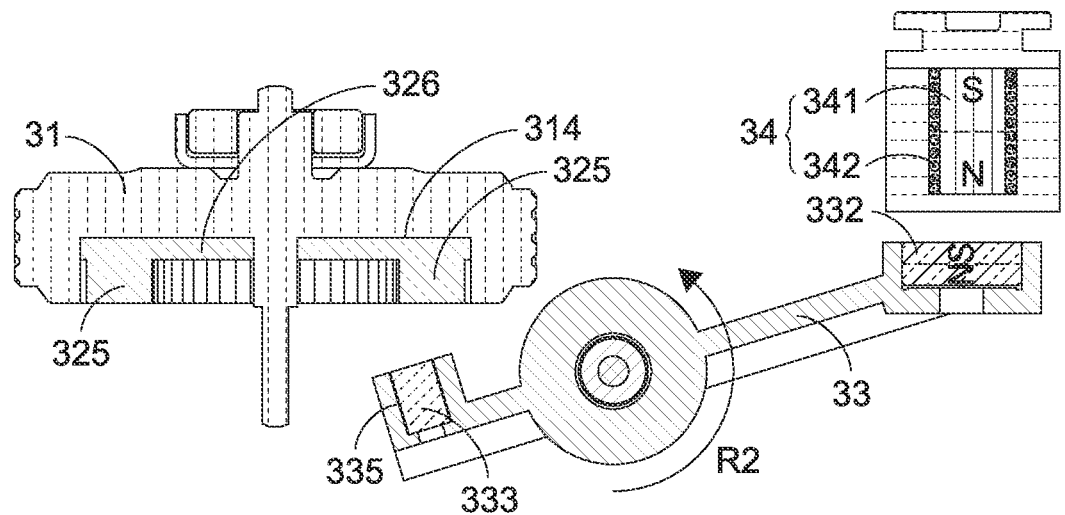
FIG. 27 schematically illustrates the attractive interaction and the approach between the pole-reversible magnetic element and the first magnetic element of the roller module shown in FIG. 24.
Figure 28:
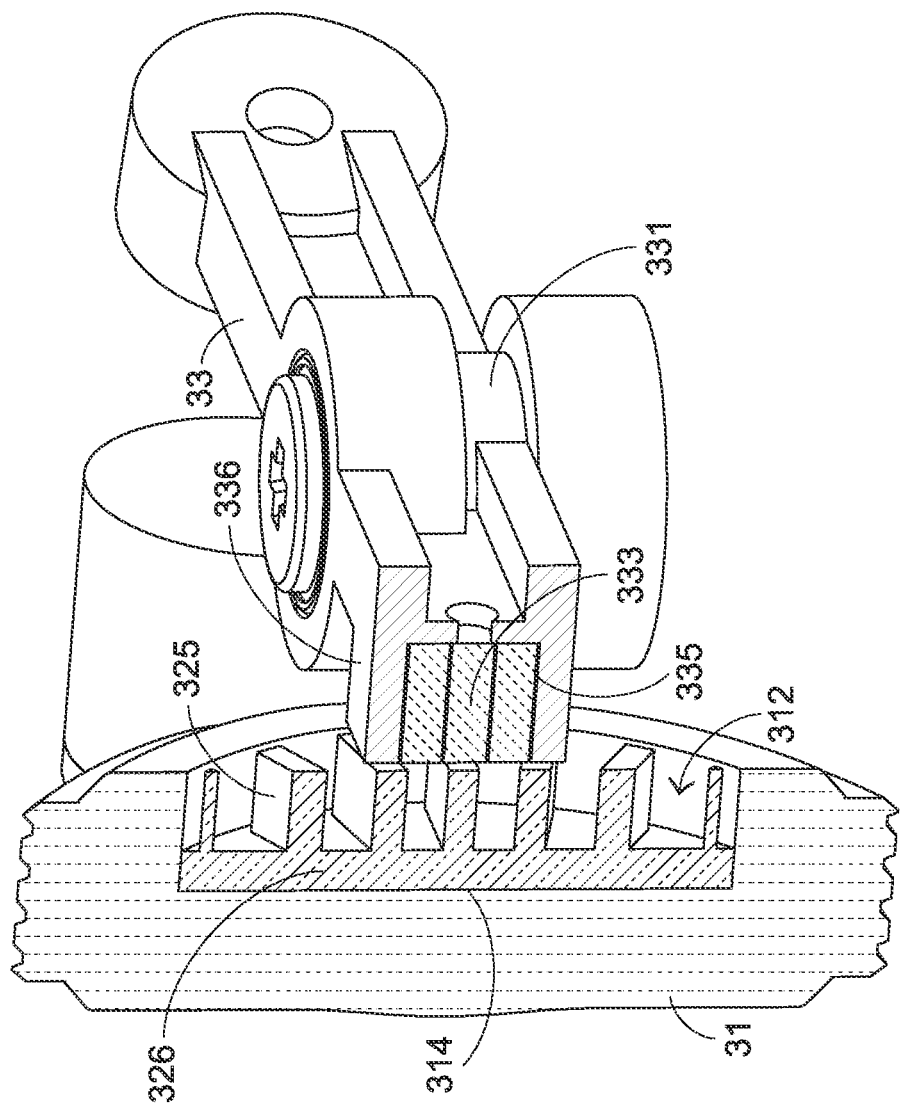
FIG. 28 is a schematic cutaway view illustrating the roller module shown in FIG. 24 and taken along the line E-E.

FIG. 24 is a schematic perspective view illustrating a roller module according to a third embodiment of the present invention. FIG. 25 is a schematic exploded view illustrating the roller module shown in FIG. 24. FIG. 26 schematically illustrates the repulsive interaction and the separation between the pole-reversible magnetic element and the first magnetic element of the roller module shown in FIG. 24. FIG. 27 schematically illustrates the attractive interaction and the approach between the pole-reversible magnetic element and the first magnetic element of the roller module shown in FIG. 24. FIG. 28 is a schematic cutaway view illustrating the roller module shown in FIG. 24 and taken along the line E-E. In comparison with the first embodiment, the installation of the magnetization member 32 of this embodiment is distinguished. In this embodiment, the magnetization member 32 is directly installed in the inner space of the scroll wheel 31. Due to this structural design, the magnetization member 32 and the scroll wheel 31 can be also synchronously rotated with each other.

In this embodiment, the scroll wheel 31 comprises a concave structure 312. The concave structure 312 is defined by an inner ring surface 313 and an inner wall 314 collaboratively.

In this embodiment, the magnetization member 32 comprises plural magnetization blocks 325 and a circular disc 326. The plural magnetization blocks 325 are formed on the circular disc 326 and distributed radially. When the magnetization member 32 is disposed within the scroll wheel 31, the circular disc 326 of the magnetization member 32 is disposed within the concave structure 312 and fixed on the inner wall 314 of the scroll wheel 31.

In this embodiment, the swinging element 33 comprises a bent structure 336. The second receiving recess 335 is formed in the bent structure 336. The second receiving recess 335 is used for accommodating the second magnetic element 333. In addition, the second receiving recess 335 is open to the magnetization member 32 in the radial direction.

Of course, the scenarios of the interaction between the first magnetic element 332 and the pole-reversible magnetic element 34 shown in FIGS. 13 to 18 may be applied to the roller module 3 of this embodiment.

Please refer to FIGS. 26 and 27. In this embodiment, the first magnetic element 332 comprises an S-pole terminal and an N-pole terminal. The S-pole terminal of the first magnetic element 332 faces the magnetic core 341 of the pole-reversible magnetic element 34. The magnetic core 341 of the pole-reversible magnetic element 34 comprises an S-pole terminal and an N-pole terminal. The S-pole terminal of the pole-reversible magnetic element 34 faces the first magnetic element 332.

When no electric current flows through the coil 342 of the pole-reversible magnetic element 34, the pole layout of the pole-reversible magnetic element 34 is determined according to the original pole layout of the magnetic core 341. That is, the S-pole terminal of the pole-reversible magnetic element 34 faces the first magnetic element 332. Under this circumstance, the pole-reversible magnetic element 34 and the first magnetic element 332 are separated from each other in response to the repulsive force therebetween. Consequently, as shown in FIG. 26, the first magnetic element 332 of the swinging element 33 is moved in a first rotation direction R1. Correspondingly, the second magnetic element 333 on the bent structure 336 is moved in the first rotation direction R1, and then moved to the position near the magnetization member 32.

When an electric current flows through the coil 342 of the pole-reversible magnetic element 34, the pole layout of the pole-reversible magnetic element 34 is opposite to the pole layout of the magnetic core 341. That is, the N-pole terminal of the pole-reversible magnetic element 34 faces the first magnetic element 332. Under this circumstance, the pole-reversible magnetic element 34 and the first magnetic element 332 are moved in the direction close to each other in response to the magnetic attraction force therebetween. Consequently, as shown in FIG. 27, the first magnetic element 332 of the swinging element 33 is moved in a second rotation direction R2. Correspondingly, the second magnetic element 333 on the bent structure 336 is also moved in the second rotation direction R2 and then moved to the position away from the magnetization member 32. The second rotation direction R2 is opposite to the first rotation direction R1.

In order to increase the magnetic attraction force between the second magnetic element 333 and the magnetization member 32, the pole layout structure is specially designed. Like the first embodiment of FIG. 8, the second magnetic element 333 comprises at least three magnets. The pole layout structure is similar to that of FIG. 8.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A roller module, comprising:
a scroll wheel;
a magnetization member synchronously rotated with the scroll wheel;
a swinging element comprising a pivotal part, a first magnetic element and a second magnetic element, wherein the first magnetic element and the second magnetic element are movable by using the pivotal part as a rotation center; and
a pole-reversible magnetic element, wherein the pole-reversible magnetic element and the first magnetic element interact with each other, so that the second magnetic element is close to or away from the magnetization member,
wherein the magnetization member has a gear structure, and the gear structure comprises plural tooth tips and plural tooth roots, which are alternately arranged in a radial direction, wherein when the second magnetic element is away from the magnetization member, the scroll wheel is rotated in a smooth scrolling mode, wherein when the second magnetic element is close to the magnetization member, a magnetic attraction force between the second magnetic element and the plural tooth tips of the magnetization member is larger than a magnetic attraction force between the second magnetic element and the plural tooth roots of the magnetization member, so that the scroll wheel is rotated in a step scrolling mode,
wherein the magnetization member comprises plural magnetization sheets, and the plural magnetization sheets are stacked along an axial direction.

2. The roller module according to claim 1, wherein the second magnetic element comprises a first magnet, a second magnet and a third magnet, wherein the second magnet is stacked on a top side of the first magnet, and the third magnet is stacked on a bottom side of the first magnet, wherein an S-pole terminal and an N-pole terminal of the first magnet are arranged along a horizontal direction, and the S-pole terminal of the first magnet is close to a tooth tip of the plural tooth tips of the magnetization member, wherein an S-pole terminal and an N-pole terminal of the second magnet are arranged along a vertical direction, and the S-pole terminal of the second magnet faces the first magnet, wherein an S-pole terminal and an N-pole terminal of the third magnet are arranged along the vertical direction, and the S-pole terminal of the third magnet faces the first magnet.

3. The roller module according to claim 1 wherein the second magnetic element comprises a first magnet, a second magnet and a third magnet, wherein the second magnet is stacked on a top side of the first magnet, and the third magnet is stacked on a bottom side of the first magnet, wherein an S-pole terminal and an N-pole terminal of the first magnet are arranged along a horizontal direction, and the N-pole terminal of the first magnet is close to a tooth tip of the plural tooth tips of the magnetization member, wherein an S-pole terminal and an N-pole terminal of the second magnet are arranged along a vertical direction, and the N-pole terminal of the second magnet faces the first magnet, wherein an S-pole terminal and an N-pole terminal of the third magnet are arranged along the vertical direction, and the N-pole terminal of the third magnet faces the first magnet.

4. The roller module according to claim 1, wherein the magnetization member has an external gear structure, the magnetization member has a central channel, and the scroll wheel comprises a rotation shaft, wherein an end of the rotation shaft is inserted into and fixed in the central channel, so that the magnetization member is permitted to be synchronously rotated with the scroll wheel.

5. The roller module according to claim 1, wherein the magnetization member has an internal gear structure with an outer ring surface, and the scroll wheel has an inner ring surface, wherein the outer ring surface of the magnetization member is fixed on the inner ring surface of the scroll wheel.

6. The roller module according to claim 1, wherein the magnetization member comprises plural magnetization blocks and a circular disc, and the plural magnetization blocks are formed on the circular disc and distributed radially, wherein the scroll wheel comprises a concave structure, and the circular disc is disposed within the concave structure.

7. The roller module according to claim 1, wherein the roller module further comprises a supporting seat and a ball bearing, wherein the scroll wheel, the magnetization member and the swinging element are supported by the supporting seat, and the supporting seat comprises a pivotal shaft, wherein the pivotal part of the swinging element is a shaft bushing, and the pivotal part of the swinging element is installed on the pivotal shaft of the supporting seat, wherein the ball bearing is arranged between the shaft bushing of the swinging element and the pivotal shaft of the supporting seat, and the ball bearing comprises an inner ring part and an outer ring part, wherein the inner ring part is contacted with the pivotal shaft of the supporting seat, and the outer ring part is contacted with the shaft bushing of the swinging element.

8. The roller module according to claim 7, wherein the roller module further comprises a buffering structure, and the buffering structure is arranged between the supporting seat and the swinging element.

9. The roller module according to claim 7, wherein a distance between the first magnetic element and the pivotal part is longer than a distance between the second magnetic element and the pivotal part.

10. The roller module according to claim 1, wherein the pole-reversible magnetic element comprises a magnetic core and a coil, and the coil is wound around the magnetic core, wherein when an electric current flows through the coil, a pole layout of the pole-reversible magnetic element is opposite to a pole layout of the magnetic core.

11. The roller module according to claim 1, wherein the roller module further comprises a buffering structure, and the buffering structure is arranged between the pole-reversible magnetic element and the first magnetic element.

12. An input device, comprising:
a casing comprising an opening; and
a roller module comprising:
   a scroll wheel partially exposed outside through the opening;
   a magnetization member synchronously rotated with the scroll wheel;
   a swinging element comprising a pivotal part, a first magnetic element and a second magnetic element, wherein the first magnetic element and the second magnetic element are movable by using the pivotal part as a rotation center; and
   a pole-reversible magnetic element, wherein the pole-reversible magnetic element and the first magnetic element interact with each other, so that the second magnetic element is close to or away from the magnetization member,
   wherein the magnetization member has a gear structure, and the gear structure comprises plural tooth tips and plural tooth roots, which are alternately arranged in a radial direction, wherein when the second magnetic element is away from the magnetization member, the scroll wheel is rotated in a smooth scrolling mode, wherein when the second magnetic element is close to the magnetization member, a magnetic attraction force between the second magnetic element and the plural tooth tips of the magnetization member is larger than a magnetic attraction force between the second magnetic element and the plural tooth roots of the magnetization member, so that the scroll wheel is rotated in a step scrolling mode,
   wherein the magnetization member comprises plural magnetization sheets, and the plural magnetization sheets are stacked along an axial direction.

13. The input device according to claim 12, wherein the second magnetic element comprises a first magnet, a second magnet and a third magnet, which are arranged in a stack form, wherein the second magnet is stacked on a top side of the first magnet, and the third magnet is stacked on a bottom side of the first magnet, wherein an S-pole terminal and an N-pole terminal of the first magnet are arranged along a horizontal direction, and the S-pole terminal of the first magnet is close to a tooth tip of the plural tooth tips of the magnetization member, wherein an S-pole terminal and an N-pole terminal of the second magnet are arranged along a vertical direction, and the S-pole terminal of the second magnet faces the first magnet, wherein an S-pole terminal and an N-pole terminal of the third magnet are arranged along the vertical direction, and the S-pole terminal of the third magnet faces the first magnet.

14. The input device according to claim 12, wherein the second magnetic element comprises a first magnet, a second magnet and a third magnet, wherein the second magnet is stacked on a top side of the first magnet, and the third magnet is stacked on a bottom side of the first magnet, wherein an S-pole terminal and an N-pole terminal of the first magnet are arranged along a horizontal direction, and the N-pole terminal of the first magnet is close to a tooth tip of the plural tooth tips of the magnetization member, wherein an S-pole terminal and an N-pole terminal of the second magnet are arranged along a vertical direction, and the N-pole terminal of the second magnet faces the first magnet, wherein an S-pole terminal and an N-pole terminal of the third magnet are arranged along the vertical direction, and the N-pole terminal of the third magnet faces the first magnet.

15. The input device according to claim 12, wherein the magnetization member has an external gear structure, the magnetization member has a central channel, and the scroll wheel comprises a rotation shaft, wherein an end of the rotation shaft is inserted into and fixed in the central channel, so that the magnetization member is permitted to be synchronously rotated with the scroll wheel.

16. The input device according to claim 12, wherein the magnetization member has an internal gear structure with an outer ring surface, and the scroll wheel has an inner ring surface, wherein the outer ring surface of the magnetization member is fixed on the inner ring surface of the scroll wheel.

17. The input device according to claim 12, wherein the roller module further comprises a supporting seat and a ball bearing, wherein the scroll wheel, the magnetization member and the swinging element are supported by the supporting seat, and the supporting seat comprises a pivotal shaft, wherein the pivotal part of the swinging element is a shaft bushing, and the pivotal part of the swinging element is installed on the pivotal shaft of the supporting seat, wherein the ball bearing is arranged between the shaft bushing of the swinging element and the pivotal shaft of the supporting seat, and the ball bearing comprises an inner ring part and an outer ring part, wherein the inner ring part is contacted with the pivotal shaft of the supporting seat, and the outer ring part is contacted with the shaft bushing of the swinging element.

18. The input device according to claim 17, wherein a distance between the first magnetic element and the pivotal part is longer than a distance between the second magnetic element and the pivotal part.

19. The input device according to claim 12, wherein the pole-reversible magnetic element comprises a magnetic core and a coil, and the coil is wound around the magnetic core, wherein when an electric current flows through the coil, a pole layout of the pole-reversible magnetic element is opposite to a pole layout of the magnetic core.

20. The input device according to claim 12, wherein the input device is a mouse device, a keyboard, a drawing tablet, a game controller, a video editor or a live broadcast controller.

21. A roller module, comprising:
a scroll wheel;
a magnetization member synchronously rotated with the scroll wheel;
a swinging element comprising a pivotal part, a first magnetic element and a second magnetic element, wherein the first magnetic element and the second magnetic element are movable by using the pivotal part as a rotation center;
a pole-reversible magnetic element, wherein the pole-reversible magnetic element and the first magnetic element interact with each other, so that the second magnetic element is close to or away from the magnetization member;
a supporting seat; and
a ball bearing,
wherein the scroll wheel, the magnetization member and the swinging element are supported by the supporting seat, and the supporting seat comprises a pivotal shaft, wherein the pivotal part of the swinging element is a shaft bushing, and the pivotal part of the swinging element is installed on the pivotal shaft of the supporting seat, wherein the ball bearing is arranged between the shaft bushing of the swinging element and the pivotal shaft of the supporting seat, and the ball bearing comprises an inner ring part and an outer ring part, wherein the inner ring part is contacted with the pivotal shaft of the supporting seat, and the outer ring part is contacted with the shaft bushing of the swinging element.

22. The roller module according to claim 21, wherein the roller module further comprises a buffering structure, and the buffering structure is arranged between the supporting seat and the swinging element.

23. The roller module according to claim 21, wherein a distance between the first magnetic element and the pivotal part is longer than a distance between the second magnetic element and the pivotal part.

24. An input device, comprising:
a casing comprising an opening; and
a roller module comprising:
   a scroll wheel partially exposed outside through the opening;
   a magnetization member synchronously rotated with the scroll wheel;
   a swinging element comprising a pivotal part, a first magnetic element and a second magnetic element, wherein the first magnetic element and the second magnetic element are movable by using the pivotal part as a rotation center; and
   a pole-reversible magnetic element, wherein the pole-reversible magnetic element and the first magnetic element interact with each other, so that the second magnetic element is close to or away from the magnetization member;
a supporting seat; and
a ball bearing,
wherein the scroll wheel, the magnetization member and the swinging element are supported by the supporting seat, and the supporting seat comprises a pivotal shaft, wherein the pivotal part of the swinging element is a shaft bushing, and the pivotal part of the swinging element is installed on the pivotal shaft of the supporting seat, wherein the ball bearing is arranged between the shaft bushing of the swinging element and the pivotal shaft of the supporting seat, and the ball bearing comprises an inner ring part and an outer ring part, wherein the inner ring part is contacted with the pivotal shaft of the supporting seat, and the outer ring part is contacted with the shaft bushing of the swinging element.

25. The input device according to claim 24, wherein a distance between the first magnetic element and the pivotal part is longer than a distance between the second magnetic element and the pivotal part.

* * * * *